US008780693B2

(12) United States Patent
Kim et al.

(10) Patent No.: US 8,780,693 B2
(45) Date of Patent: Jul. 15, 2014

(54) CODING APPROACH FOR A ROBUST AND FLEXIBLE COMMUNICATION PROTOCOL

(75) Inventors: Minji Kim, Cambridge, MA (US); Muriel Medard, Belmont, MA (US); Ali Parandehgheibi, Medford, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 225 days.

(21) Appl. No.: 13/291,310

(22) Filed: Nov. 8, 2011

(65) Prior Publication Data

US 2013/0114481 A1    May 9, 2013

(51) Int. Cl.
 *G01R 31/08* (2006.01)
 *H04L 12/28* (2006.01)
 *H04L 12/56* (2006.01)
 *H04J 3/22* (2006.01)
 *G06F 15/16* (2006.01)
 *G06F 15/173* (2006.01)

(52) U.S. Cl.
 USPC ........ 370/216; 370/231; 370/235; 370/395.1; 370/469; 709/203; 709/230; 709/238

(58) Field of Classification Search
 USPC ......... 370/212, 280, 310, 328, 384, 389, 400, 370/474, 216, 231, 235, 395.1, 469; 709/219, 225, 231, 203, 230, 235, 238; 725/62, 86, 95, 96, 118, 119
 See application file for complete search history.

(56) References Cited

U.S. PATENT DOCUMENTS

| | | | |
|---|---|---|---|
| 5,577,056 | A | 11/1996 | Malik et al. |
| 6,128,773 | A | 10/2000 | Snider |
| 6,621,851 | B1 | 9/2003 | Agee et al. |
| 6,885,653 | B2 | 4/2005 | Choi et al. |
| 7,064,489 | B2 | 6/2006 | Price |
| 7,071,853 | B2 | 7/2006 | Price |
| 7,095,343 | B2 | 8/2006 | Xie et al. |

(Continued)

FOREIGN PATENT DOCUMENTS

| | | |
|---|---|---|
| EP | 1 638 239 A1 | 3/2006 |
| WO | WO 2007/109216 A1 | 9/2007 |

(Continued)

OTHER PUBLICATIONS

Ahlswede, et al.; "Network Information Flow;" IEEE Transactions on Information Theory; vol. 46; No. 4; Jul. 2000, pp. 1204-1216.

(Continued)

*Primary Examiner* — Alpus H Hsu
*Assistant Examiner* — Dharmesh Patel
(74) *Attorney, Agent, or Firm* — Daly, Crowley, Mofford & Durkee, LLP

(57) ABSTRACT

A coding approach for a robust and flexible network communication protocol is described. By using coding, it is possible to eliminate the need to track packet identities, and hence, it is possible to reduce coordination overhead associated with many conventional protocols. The method and system described herein takes advantage of multiple paths, interfaces, mediums, servers, and storage locations available in a network. The proposed protocol allows quick response to congestion by load balancing over different network resources. The method also enables soft vertical hand-overs across heterogeneous networks. In one embodiment, a media file is divided into chunks and transmitted using a transport protocol tailored to meet delay requirements of media streaming applications. Also described are different coding strategies for chunk delivery based upon an urgency level of each chunk.

36 Claims, 5 Drawing Sheets

(56) References Cited

U.S. PATENT DOCUMENTS

| | | | |
|---|---|---|---|
| 7,164,691 B2 | 1/2007 | Knapp et al. | |
| 7,283,564 B2 | 10/2007 | Knapp et al. | |
| 7,349,440 B1 | 3/2008 | Chou et al. | |
| 7,408,938 B1 | 8/2008 | Chou et al. | |
| 7,414,978 B2 | 8/2008 | Lun et al. | |
| 7,529,198 B2 | 5/2009 | Jain et al. | |
| 7,706,365 B2 | 4/2010 | Effros et al. | |
| 7,760,728 B2 | 7/2010 | Chou et al. | |
| 7,821,980 B2 | 10/2010 | Chakrabarti et al. | |
| 7,876,677 B2 | 1/2011 | Cheshire | |
| 7,912,003 B2* | 3/2011 | Radunovic et al. | 370/329 |
| 7,945,842 B2 | 5/2011 | He | |
| 8,040,836 B2 | 10/2011 | Wu et al. | |
| 8,068,426 B2 | 11/2011 | Sundararajan et al. | |
| 8,130,776 B1 | 3/2012 | Sundararajan et al. | |
| 8,279,781 B2 | 10/2012 | Lucani et al. | |
| 8,451,756 B2 | 5/2013 | Lucani et al. | |
| 8,482,441 B2 | 7/2013 | Medard et al. | |
| 8,504,504 B2* | 8/2013 | Liu | 706/46 |
| 8,571,214 B2 | 10/2013 | Lima et al. | |
| 2003/0055614 A1 | 3/2003 | Pelikan | |
| 2003/0214951 A1 | 11/2003 | Joshi et al. | |
| 2004/0203752 A1* | 10/2004 | Wojaczynski et al. | 455/432.1 |
| 2005/0010675 A1 | 1/2005 | Jaggi et al. | |
| 2005/0078653 A1 | 4/2005 | Agashe et al. | |
| 2005/0152391 A1 | 7/2005 | Effros et al. | |
| 2005/0251721 A1 | 11/2005 | Ramesh et al. | |
| 2006/0020560 A1* | 1/2006 | Rodriguez et al. | 705/75 |
| 2006/0146791 A1 | 7/2006 | Deb et al. | |
| 2006/0224760 A1 | 10/2006 | Yu et al. | |
| 2007/0046686 A1 | 3/2007 | Keller | |
| 2007/0116027 A1 | 5/2007 | Ciavaglia et al. | |
| 2007/0274324 A1* | 11/2007 | Wu et al. | 370/400 |
| 2008/0043676 A1 | 2/2008 | Mousseau et al. | |
| 2008/0049746 A1 | 2/2008 | Morrill et al. | |
| 2008/0123579 A1 | 5/2008 | Kozat et al. | |
| 2008/0259796 A1 | 10/2008 | Abousleman et al. | |
| 2008/0291834 A1 | 11/2008 | Chou et al. | |
| 2008/0320363 A1 | 12/2008 | He | |
| 2009/0003216 A1 | 1/2009 | Radunovic et al. | |
| 2009/0135717 A1 | 5/2009 | Kamal et al. | |
| 2009/0153576 A1 | 6/2009 | Keller | |
| 2009/0175320 A1 | 7/2009 | Haustein et al. | |
| 2009/0198829 A1 | 8/2009 | Sengupta et al. | |
| 2009/0207930 A1 | 8/2009 | Sirkeci et al. | |
| 2009/0238097 A1 | 9/2009 | Le Bars et al. | |
| 2009/0248898 A1 | 10/2009 | Gkantsidis et al. | |
| 2009/0285148 A1 | 11/2009 | Luo et al. | |
| 2009/0310582 A1 | 12/2009 | Beser | |
| 2009/0313459 A1 | 12/2009 | Horvath | |
| 2009/0316763 A1 | 12/2009 | Erkip et al. | |
| 2010/0014669 A1 | 1/2010 | Jiang | |
| 2010/0046371 A1 | 2/2010 | Sundararajan et al. | |
| 2010/0111165 A1 | 5/2010 | Kim et al. | |
| 2010/0146357 A1* | 6/2010 | Larsson | 714/750 |
| 2011/0238855 A1* | 9/2011 | Korsunsky et al. | 709/231 |
| 2012/0057636 A1 | 3/2012 | Tian et al. | |
| 2012/0218891 A1 | 8/2012 | Sundararajan et al. | |
| 2012/0300692 A1 | 11/2012 | Sfar et al. | |
| 2013/0107764 A1 | 5/2013 | Zeger et al. | |
| 2013/0114481 A1 | 5/2013 | Kim et al. | |
| 2013/0114611 A1 | 5/2013 | Zeger et al. | |
| 2013/0195106 A1 | 8/2013 | Calmon et al. | |

FOREIGN PATENT DOCUMENTS

| | | |
|---|---|---|
| WO | WO 2010/005181 A2 | 1/2010 |
| WO | WO 2010/005181 A3 | 1/2010 |
| WO | WO 2010/025362 A2 | 3/2010 |
| WO | WO 2010/025362 A3 | 3/2010 |
| WO | WO 2011/043754 A1 | 4/2011 |
| WO | WO 2011/119909 A1 | 9/2011 |
| WO | WO 2012/167034 A2 | 12/2012 |
| WO | WO 2013/006697 A2 | 1/2013 |
| WO | WO 2013/067488 A1 | 5/2013 |
| WO | WO 2013/116456 A1 | 8/2013 |

OTHER PUBLICATIONS

Allman, et al.; "Fast Retransmit / Fast Recovery—TCP Congestion Control;" IETF; Section 3.2; RFC 2581; http://tools.ietf.org/html/rfc2581#section-3.2; Apr. 1999; downloaded on Nov. 2, 2011; 14 pages.

Awerbuch, et al.; "On-Line Generalized Steiner Problem;" Proceedings of the 7th Annual ACM-SIAM Symposium on Discrete Algorithms; pp. 1-12; 1996.

Dimakis, et al.; "Network Coding for Distributed Storage Systems;" IEEE/ACM Transactions on Information Theory; vol. 56; No. 9; pp. 1-13.

Ford, et al.; "TCP Extensions for Multipath Operation with Multiple Addresses;" Internet draft, draft-ford.mptcp-multiaddressed-03; Work in Progress, Mar. 2010; pp. 1-36.

Ho, et al.; "On the utility of network coding in dynamic environments;" International Workshop on Wireless AD-HOC Networks (IWWAN); 2004; pp. 1-5.

Ho, et al.; "The Benefits of Coding over Routing in a Randomized Setting;" Proceedings of 2003 IEEE International Symposium on Information Theory; Jun. 2003; pp. 1-6.

Jaggi, et al.; "Low Complexity Algebraic Multicast Network Codes;" Proceedings of the IEEE International Symposium on Information Theory; Jul. 4, 2003; 1 page.

Kodialam, et al.; "Online Multicast Routing With Bandwidth Guarantees: A New Approach Using Multicast Network Flow;" IEEE/ACM Transactions on Networking; vol. 11; No. 4; Aug. 2003; pp. 676-686.

Koetter, et al.; "An Algebraic Approach to Network Coding;" IEEE/ACM Transactions on Networking; vol. 11; No. 5; Oct. 2003; pp. 782-795.

Koetter, et al.; "Beyond Routing: An Algebraic Approach to Network Coding;" IEEE Infocom; 2002; 9 pages.

Noguichi, et al.; "Performance Evaluation of New Multicast Architecture with Network Coding;" IEICE Transactions on Communication, E86-B; No. 6; Jun. 2003; 3 pages.

Servetto, et al.; "Constrained Random Walks on Random Graphs: Routing Algorithms for Large Scale Wireless Sensor Networks;" WSNA 02; Sep. 28, 2002; 10 pages.

Frossard, et al.; "Media Streaming With Network Diversity," Invited Paper; Proceedings of the IEEE; vol. 96, No. 1; Jan. 2008; pp. 39-53.

Nguyen, et al.; "Internet Media Streaming Using Network Coding and Path Diversity," IEEE Global Telecommunications Conference; Nov. 30-Dec. 4, 2008; 5 pages.

Nguyen, et al; "Video Streaming with Network Coding;" Journal of Signal Processing Systems; vol. 59, Issue 3; DOI: 10.1007/s11265-009-0342-7; Jun. 2010; p. 319-333.

Sundarajan, et al.; "Network coding meets TCP;" IEEE Infocom 2009; Digital Object Identifier: 10.1109/Infocom.2009.5061931, Publication Year: Jan. 2009; p. 280-288.

Sundarajan, et al.; "Network Coding Meets TCP: Theory and Implementation;" Proceedings of the IEEE; vol. 99, Issue 3; Digital Object Identifier: 10.1109/JPROC.2010.2093850; Publication Year: Mar. 2011; pp. 490-512.

Zhang, et al.; "Optimized Multipath Network Coding in Loss Wireless Networks;" ICDCS '08 Proceedings of the 2008 The 28th International Conference on Distributing Computing Systems; Jan. 2008; 12 pages.

Kim, et. al.; "Modeling Network Coded TCP Throughput: A Simple Model and its Validation", Conference paper published May 2012, 10 pages.

Kim, et. al.; "Modeling Network Coded TCP Throughput: A Simple Model and its Validation", Nov. 2010, 19 pages.

Lucani et al; "Broadcasting in Time-Division Duplexing: A Random Linear Network Coding Approach;" presented Switzerland; Conference: NetCod 2009, Lausanne, Switzerland; Jun. 2009; 6 pages.

Lucani et al; "On Coding for Delay—New Approaches Based on Network Coding in Networks with Large Latency;" Conference: ITA Workshop, San Diego, USA; Feb. 2009; 10 pages.

(56) References Cited

OTHER PUBLICATIONS

Lucani et al; "Random Linear Network Coding for Time Division Duplexing: Energy Analysis;" Conference: ICC 2009, Dresden, Germany; Jun. 2009; 5 pages.

Lucani et al; "Random Linear Network Coding for Time Division Duplexing: Field Size Considerations;" Conference: Globecom 2009, Hawaii, USA; Dec. 2009; 6 pages.

Lucani et al; "Random Linear Network Coding for Time-Division Duplexing: Queueing Analysis;" Conference ISIT 2009, Seoul, Korea; Jul. 209; 5 pages.

Lucani et al; "Random Linear Network Coding for Time-Division Duplexing: when to stop talking and start listening;" Presentation in Infocom; Slide Presentation; Apr. 23, 2009; 10 pages.

Lucani et al; "On Coding for Delay New Approaches based on Network Coding in Networks with Large Latency;" Conference ITA Workshop, San Diego, USA; Slide Presentation; Feb. 13, 2009; 12 pages.

Lucani et al; "Random Linear Network Coding for Time-Division Duplexing: when to stop talking and start listening;" Presentation in ICC; Slide Presentation; Jun. 16, 2009; 6 pages.

Lucani et al.; "On Coding for Delay New Approaches based on Network Coding in Network Coding in Networks with Large Latency;" Presentation in NetCod; Slide Presentation; Jun. 16, 2009; 17 pages.

PCT Search Report of the ISA for PCT/US2009/055359 dated Mar. 30, 2011.

Written Opinion of the ISA for PCT/US2009/055359 dated Mar. 30, 2011.

International Preliminary Report on Patentability of the ISA for PCT/US2009/055359 dated Apr. 21, 2011.

"Data Service Options for Spread Spectrum Systems: Radio Link Protocol Type 3;" 3GPP2 C.S0017-010-A; Version 2.0; Sep. 2005.

"Guest Editorial Wireless Video Transmission;" IEEE Journal on Selected Areas in Communications; vol. 28; No. 3; Apr. 2010; pp. 297-298.

Abichar, et al.; "WiMax vs. LTE: Who Will Lead the Broadband Mobile Internet?;" Mobile Computing IEEE Computer Society; IT Pro May/Jun. 2010; pp. 26-32.

AbuZeid, et al.; "IR-HARQ vs. Joint Channel-Network Coding for Cooperative Wireless Communication;" Cyber Journals: Multidisciplinary Journals in Science and Technology, Journal of Selected Areas in Telecommunications (JSAT); Aug. 2011; pp. 39-43.

Acedanski, et al.; "How Good is Random Linear Coding Based Distributed Network Storage?; " Proc. $1^{st}$ Workshop on Network Coding, Theory, and Applications (Netcod'05); Apr. 2005; 6 pages.

Adamson, et al.; "Multicast Negative-Acknowledgement (NACK) Building Blocks;" Internet Engineering Task Force (IETF),RFC; vol. 5401; Nov. 2008; 42 pages.

Adamson, et al.; "NACK-Oriented Reliable (NORM) Transport Protocol;" Internet Engineering Task Force (IETF); RFC; vol. 5740; Nov. 2009; 94 pages.

Adamson, et al.; "Quantitative Prediction of NACK—Oriented Reliable Multicast (NORM) Feedback;" Proceedings, MILCOM 2000; vol. 2; Oct. 2002; 6 pages.

Ahlswede, et al.; "Network Information Flow;" IEEE Transactions on Information Theory; vol. 46; No. 4; Jul. 2000; pp. 1204-1216.

Ahmed, et al.; "On the Scaling Law of Network Coding Gains in Wireless Networks;" IEEE; MILCOM 2007; Oct. 2007; 7 pages.

Allman, et al.; "Fast Retransmit / Fast Recovery—TCP Congestion Control;" IETF; Section 3.2; RFC 2581; http://tools.ietf.org/html/rfc2581#section-3.2; Apr. 199; downloaded on Nov. 2, 2011; 14 pages.

Armstrong, et al.; "Distributed Storage with Communication Costs;" IEEE Forty-Ninth Annual Allerton Conference—Allerton House; Sep. 28-30, 2011; pp. 1358-1365.

Awerbuch, et al.; "On-Line Generealized Steiner Problem;" Proceedings of the $7^{th}$ Annual ACM-SIAM Symposium on Discrete Algorithms; pp. 1-12; 1996.

Baek, et al.; "The International journal of Computer and Teiocommunications Networking," vol. 56; Issue 6; Apr. 2012; pp. 1745-1762.

Baron, et al.; "Coding Schemes for Multislot in Multichannel ALOHA With Deadlines;" IEEE Transactions on Wireless Communications; vol. 1; No. 2; Apr. 2002; pp. 292-301.

Bellare, et al.; "A Concrete Security Treatment of Symmetric Encryption: Analysis of the DES Modes of Operation;" Proc. $38^{th}$ Annual Symposium of Foundations Computer Science; Oct. 1997; pp. 1-32.

Berman, et al.; "Improved Approximations for the Steiner Tree Problem;" Journal of Algorithms; Chapter 39; pp. 325-334.

Bhadra, et al.; "Looking at Large Networks: Coding vs. Queuing;" Prof. Of the $25^{th}$ IEEE International Conference on Computer Communications (Infocom); Apr. 2006; 12 pages.

Bharath-Kumar, et al.; "Routing to Multiple Destinations in Computer Networks;" IEEE Transactions on Communications; vol. Com-31; No. 3, Mar. 1983; pp. 343-351.

Bhargava, et al.; "Forward Error Correction Coding;" Mobile Communications Handbook; Part 1: Basic Principals; 1999; 18 pages.

Birk, et al.; "Judicious Use of Redundant Transmission in Multichannel ALOHA Networks with Deadlines;" IEEE Journal on Selected Areas In Communications; vol. 17; No. 2; Feb. 1999; pp. 257-269.

Bisson, et al.; "Reducing Hybrid Disk Write Latency with Flash-Backed I/O Requests;" Proceedings of the Fifteenth IEEE International Symposium on Modeling, Analysis, and Simulation of Computer and Telecommunicatons Systems (MASCOTS'07); Oct. 2007; pp. 402-409.

Bonnin, et al.; "Automatic Multi-Interface Management Through Profile Handling;" Springer; Mobile Networks and Applications; Feb. 2009; pp. 4-17.

Borokhovich, et al.; "Tight bounds for Algebraic Gossip on Graphics;" Proc. Of the IEE International Symposium in Information Theory (ISIT); Jun. 13-18, 2010; 14 pages.

Borst, et al.; "Distributed Caching Algorithms for Content Distribution Networks"; IEEE Infocom; 2010 Proceedings IEEE; Mar. 14-19, 2010; 9 pages.

Borst, et al.; "Distributed Caching Algorithms for Content Distribution Networks;" Power Point Presentation; BCAM Seminar; Bilbao, Sep. 30, 2010; 36 pages.

Bui, et al.; "A Markovian Approach to Multipath Data Transfer in Overlay Networks;" IEEE Transactions on Parallel and Distributed Systems; vol. 21; No. 10; Oct. 2010; pp. 1398-1411.

Cai, et al.; "Secure Network Coding;" IEEE; ISIT; Jun. 30-Jul. 5, 202; p. 323.

Calmon, et al.; "Networking Coding Over Multiple Network Interfaces Using TCP;" Presentation; Information Theory and Application Workshop (ITA) 2012; San Diego, CA; Feb. 5, 2012; 55 pages.

Cardinal, et al; "Minimum Entrophy Combinatorial Optimization Problems;" Data Structure and Algorithms, Discrete Mathematics; Aug. 17, 2010; pp. 1-16.

Castro, et al.; "Upper and Lower Error Bounds for Active Learning;" The 44'th Annual Allerton Conference on Communication, Control and Computing; vol. 2, No. 2.1; 2006, 10 pages.

Celik, et al.; "MAC for Networks with Multipacket Reception Capability and Spatially Distributed Nodes;" Proc, IEEE Infocom 2008; Apr. 2008; 9 pages.

Celik; "Distributed MAC Protocol for Networks with Muitipacket Reception Capability and Spatially Distributed Nodes;" Master's Thesis; MIT Department of Electrical Engineering and Computer Science; May 2007; 127 pages.

Cha, et al.; "I Tube, You Tube, Everybody Tubes: Analyzing the World's Largest User Generated Content Video System;" $7^{th}$ ACM GIGCOMM Conference on Internet Measurement: IMC'07; Oct. 24-26, 2007; 13 pages.

Chakrabarti, et al.; "Approximation Algorithms for the Unsplittable Flow Problem;" Proceedings of the $5^{th}$ International Workshop on Approximation Algorithms for Combinatorial Optimization; Sep. 2005, pp. 1-27.

Chakrabarti, et al.; Approximation Algorithms for the Unsplittable Flow Problem; Algorithmica (2007); Springer Science—Business Media, Aug. 2006; 16 pages.

(56) References Cited

OTHER PUBLICATIONS

Charikar, et al.; "Approximation Algorithms for Directed Steiner Problems;" Proceedings of the 9$^{th}$ ACM-SIAM Symposium on Discrete Algorithms, pp. 1-15; 1998.
Chen, et al.; "Pipeline Network Coding for Multicast Streams ;" ICMU Org.; 2010; 7 pages.
Chou, et al., "FEC and Pseudo-ARQ for Receiver-driven Layered Multicast of Audio and Video;" Data Compression Conference (DCC), 2000; Proceedings; Jan. 2000; 10 pages.
Chou, et al.; "Practical Network Coding;" Proceedings of the 41$^{st}$ Annual Allerton Conference on Communication, Control, and Computing; Oct. 2003; 10 pages.
Cisco Visual Networking Index: Forecast and Methodology; 2009-2014; White Paper; Jun. 2, 2010; pp. 1-17.
Cloud, et al.; "Co-Designing Multi-Packet Reception, Network Coding, and MAC Using a Simple Predictive Model;" arXiv:1101.5779v1 [cs.NI]; Submitted to W.Opt 2011;Jan. 30, 2011; pp. 1-8.
Cloud, et al.; "Effects of MAC approaches on non-monotonic saturation with COPE-a simple case study;" Military Communication Conference, 2011—MILCOM; Aug. 11, 2011; 7 pages.
Cloud, et al.; "MAC Centered Cooperation—Synergistic Design of Network Coding, Multi-Packet Reception, and Improved Fairness to Increase Network Throughput;" IEEE Journal on Selected Areas in Communications; vol. 30; No, 2; Feb. 2012; pp. 1-8.
Cloud, et al.; "Multi-Path TCP with Network Coding;" Wireiess@mit—MIT Center for Wireless Networks and Mobile Computing; 2012 Inaugural Retreat; Oct. 10-11, 2012.
Cloud, et al; U.S. Appl. No. 13/654,953, filed Oct. 18, 2012.
Costa, et al.; "Informed Network Coding for Minimum Decoding Delay;" Fifth IEEE International Conference on Mobile Ad-hoc and Sensor Systems; Sep. 2008; pp. 80-91.
Coughlin, et al.; Years of Destiny: HDD Capital Spending and Technology Developments from 2012-2016; IEEE Santa Clara Valley Magnetics Society; Jun. 19, 2012; pp. 1-28.
Dana, et al.; "Capacity of Wireless Erasure Networks;" IEEE Transactions on Information Theory; vol. 52; No. 3; Mar. 2006; pp. 780-804.
Dana, et al.; "Capacity of Wireless Erasure Networks;" Jan. 2006; 41 pages.
Dap, et al.; "Algebraic Gossip: A Network Coding Approach to Optimal Multiple Rumor Mongering;" Proc. Of the 42$^{nd}$ Allerton Conference on Communication, Control, and Computing; Jan. 2004, 10 pages.
Deb, et al.; "On Random Network Coding Based Information Dissemination;" Proc. Of the IEEE International Symposium on Information Theory (ISIT); Sep. 4-9, 2005; 5 pages.
Demers, et al.; "Epidemic Algorithms for Replicated Database Maintenance;" PODC '87 Proceedings of the sixth annual ACM Symposium on Principles of distributed computing; Jan. 1987; pp. 1-12.
Dias, et al.; "Performance Analysis of HARQ in WiMax Networks Considering Imperfect Channel Estimation;" The 7$^{th}$ International Telecommunications Symposium (ITS 2010); 2010; 5 pages.
Dimakis, et al.; "A Survey on Network Codes for Distributed Storage;" Proceedings of the IEEE; vol. 99; No. 3; Mar. 2011; pp. 476-489.
Dimakis et al.; "Network Coding for Distributed Storage Systems;" IEEE/ACM Transactions on Information Theory; vol. 56; No. 9; pp. 1-13.
Donoho, et al.; "Estimating Covariances of Locally Stationary Processes: Rates of Convergence of Best Basis Methods;" Statistics, Stanford University, Stanford, California, USA, Tech. Rep; 1998; pp. 1-64.
Effros; Distortion-Rate Sounds for fixed-and Variabie-Rate Multiresolution Source Codes; IEEE Transactions on Information Theory; vol. 45, No. 6; Sep. 1999; pp. 1887-1910.
Effros; "Universal Multiresolutlon Source Codes;" IEEE Transactions on Information Theory; vol. 47, No. 6; Sep. 2001; pp. 2113-2129.
El Bahri, et al.; "Performance Comparison of Type I, II and III Hybrid ARQ Schemes over AWGN Channels;" 2004 IEEE International Conference on Industrial Technology (ICIT); vol. 3; Dec. 8-10, 2004; pp. 1417-1421.
Eryilmaz, et al.; On Delay Performance Gains From Network Coding; Information Science and Systems; 2006 40$^{th}$ Annual Conference on Mar. 22-24, 2006; 7 pages.
Fan, et al.; "Reliable Relay Assisted Wireless Multicast Using Network Coding;" IEEE Journal on Selected Areas in communications; vol. 27; No. 5; Jun. 2009; pp. 749-702.
Feizi, et al.; "Locally Adaptive Sampling;" Communication, Control, and Computing; 2010; 48$^{th}$ Annual Allerton Conference, IEEE; Sep. 29, 2010; pp. 152-159.
Feizi, et al.; "On Network Functional Compression;" arXiv online repository; URL: http://arxiv.org/pdf/1011.5496v2.pdf; Nov. 30, 2010p pp. 1-60.
Feizi, et al.; "When Do Only Sources Need to Compute? On Functional Compression in Tree Networks;" 47$^{th}$ Annual Allerton Conference, IEEE; Sep. 30, 2009; pp. 447-454.
Feizi, et al; "Cases Where Finding a Minimum Entrophy Coloring of a Characteristic Graph is a Polynomial Time Problem;" IEEE International Symposium on Information Theory; Jun. 13, 2010; pp. 116-120.
Ferner, et al.; "Toward Sustainable Networking; Storage Area Networks with Network Coding;" Fiftieth Annual Allerton Conference; IEEE; Oct. 1-5, 2012; pp. 517-524.
Ford; "Architectural Guidelines for Muitipath TCP Development;" Internet Engineering Task Force; Internet-Draft; Dec. 8, 2010; 17 pages.
Ford; "TCP Extension for Multipath Operation with Multiple Addresses draft-ford-mptcp-multiaddressed-03;" Internet Engineering Task Force; Internet-Draft; Mar. 8, 2010; 35 pages.
Fragouli, et al.; "Wireless Network Coding: Opportunities & Challenges;" MILCOM; Oct. 2007; 8 pages.
Frossard, et al.; "Media Streaming With Network Diversity;" Invited Paper; Proceedings of the IEEE; vol. 96, No. 1; Jan. 2008; pp. 39-53.
Galbraith, et al.; (HGST); "Iterative Detection Read Channel Technology in Hard Disk Drives;" Whitepaper; Nov. 2008; 8 pages.
Garcia-Luna-Aceves; "Challenges: Towards Truly Scalable Ad Hoc Network;" MobiCom 2007; Sep. 2007; pp. 207-214.
Garcia-Luna-Aceves; "Extending the Capacity of Ad Hoc Networks Beyond Network Coding;" IWCMC 07; Proceedings of the 2007 International Conference on Wireless Communications and Mobile Computing; ACM; 2007; pp. 91-96.
Ghaderi, et al.; Reliability Gain of Network Coding in Lossy Wireless Networks; Infocom 2008; The 27$^{TH}$ Conference on Computer Communications IEEE; Apr. 13-18, 2008; 5 pages.
Gheorghiu, et al.; "Multipath TCP with Network Coding for Wireless Mesh Networks;" IEEE Communications (ICC) 2010 International Conference; May 23-27, 2010; 5 pages.
Gheorghiu, et al., "On the Performance of Network Coding in Multi-Resoloution Wireless Video Streaming;" IEEE International Symposium on Jun. 9-11, 2010; 6 pages.
Ghez, et al.; "Stability Properties of Slotted Aloha with Multipacket Reception Capabitiy;" IEEE Transactions on Automatic Control; vol. 33; No. 7; Jul. 1988; pp. 640-640.
Gkantsidis, et al.; "Cooperative Security for Network Coding File Distribution;" Proc. IEEE Infocom; Apr. 2006; 13 pages.
Gollakota, et al.; "ZigZag Decoding: Combating Hidden Terminals in Wireless Networks;" SIGCOMM 08; Aug. 17-22; pp. 159-170.
Golrezaei, et al.; "FemtoCaching: Wireless Video Content Delivery Through Distributed Caching Helpers;" arXiv:1109.4179v2; Apr. 7, 2012; pp. 1-11.
Grant, et al.; "Graph Implementation for Nonsmooth Convex Programs;" LNCIS 371; Springer-Verlag Limited; Jan. 2008; pp. 95-110.
Gupta; "The Capacity of Wireless Networks;" IEEE Transactions on Information Therory; vol. 46; No. 2; Mar. 2000; pp. 388-404.
Hadzi-Velkov, et al.; "Capture Effect in IEEE 802.11 Basic Service Area Under Influence of Rayleigh Fading and Near/Far Effect;" IEEE; PIMRC 202; vol. 1; Sep. 2002; 5 pages.

(56) References Cited

OTHER PUBLICATIONS

Haeupler, et al.; "One Packet Suffices—Highly Efficient Packetized Network Coding With Finite Memory;" IEEE Internationai Symposium on Information Theory (ISIT) Proceedings; Jul. 31, 2011-Aug. 5, 2011; 5 pages.

Haeupler; "Analyzing Network Coding Gossip Made Easy;" Proc. Of the 43rd Symposium on Theory of Computing (STOC); Jan. 2011, 13 pages.

Haeupler, et al.; "Optimality of Network Coding in Packet Networks;" ArXiv, Feb. 17, 2011; 5 pages.

Haley et. al.; "Reversible Low-Density Parity-Check Codes;" IEEE Transactions on Information Theory; vol. 55; No. 5; May 2009; pp. 2016-2036.

Halloush, et al.; "Network Coding with Multi-Generation Mixing: Analysis and Applications for Video Communication;" IEEE International Conference on Communications; May 19, 2008; pp. 198-202.

Han, et al.; "Multi-Path TCP: A Joint Congestion Control and Routing Scheme to Exploit Path Diversity in the Internet;" IEEE/ACM Transactions on Networking (TON); vol. 14; No. 6, Dec. 2006; 26 pages.

Han, et al.; "On Nework Coding for Security;" IEEE Military Communications Conference; Oct. 2007; pp. 1-6.

Hassner, et al.; "4K Bye-Sector HDD-Data Format Standard;" Windows Hardware and Drive Central; San Jose, CA; Aug. 14, 2013; 5 pages.

Ho, et al., "A Random Linear Network Coding Approach to Multicast;" IEEE Transactions on Information Theory; vol. 52; No. 10; Oct. 2006, pp. 4413-4430.

Ho, et al.; "Byzantine Modification Detection in Multicast Networks using Randomized Network Coding;" IEEE; ISIT; Jun. 27-Jul. 2, 2004; p. 144.

Ho, et al.; "Network Coding from a Network Flow Perspective;" ISIT; Jun.-Jul. 2003; 6 pages.

Ho, et al.; "On Randomized Network Coding;" Proceedings of 41st Annual Allerton Conference on Communications, Control and Computing; Oct. 2003; 10 pages.

Ho, et al.: "On the utility of network coding in dynamic environments;" International Workshop on Wireless AD-HOC Networks (IWWAN); 2004; pp. 1-5.

Ho, et al.; "The Benefits of Coding over Routing in a Randomized Setting;" Proceedings of 2003 International Symposium on Information Theory; Jun. 2003; pp. 1-6.

Ho, et al.; "The Benefits of Coding over Routing in a Randomized Setting," IEEE; ISIT Jun. 29-Jul. 4, 2003; p. 442.

Hofri; "Disk Scheduling; FCFS vs. SSTF Revisited," Communications of the ACM; vol. 23; No. 11; Nov. 1980; pp. 645-653.

Hong, et al.; Network-coding-based hybrid ARQ scheme for mobile relay networks; Electronics Letters; vol. 46; No. 7; Apr. 1, 2010; 2 pages.

International Disk Drive Equipment and Materials Assoc.; "Advanced Standard," In Windows Hardware Engineering Conf.; May 2005; 11 pages.

Iyer, et al.; "Anticipatory scheduling: A disk scheduling framework to overcome deceptive idleness in synchronous I/O;" SIGOPS Operating Sys. Review; vol. 35; No, 5; Dec. 2001, 14 pages.

Jacobson, et al.; "Disk scheduling algorithms based on rotational position;" Hewlett-Pakard laboratories; Palo Alto, CA; Technical Report HPL-CSP-91-7rev1; Feb. 26, 1991; 17 pages.

Jaggi, et al.; "Low Complexity Algebraic Multicast Network Codes;" Proceedins of the IEEE International Symposium on Information Theory; Jul. 4, 2003; 1 page.

Jaggi, et al.; "Resilient Network Coding in the Presence of Byzantine Adversaries;" Proc. IEEE Infocom; May 2007; 9 pages.

Jakubczak, et al.; "One-Size-Fits-All Wireless Video;" ACM SigComm Hotnets 2009; 6 pages.

Jamieson, et al.; PPR: Partial Packet Recovery for Wireless Networks; SIGCOMM 07; Aug. 27-31, 2007; 12 pages.

Jamieson, et al.; "PPR: Partiel Packet Recovery for Wireless Networks;" Presentation; SIGCOMM 07; Aug. 27-31, 2007; 25 pages.

Jannaty, et al.; "Full Two-Dimensional Markov Chain Analysis of Thermal Soft Errors in Subthreshold Nanoscale CMOS Devices;" IEEE Transactions on Device and Materials Reliability; vol. 11; No. 1; Mar. 2011; pp. 50-59.

Ji, et. al; "A network coding based hybrid ARQ algorithm for wireless video broadcast;" Science China; Information Sciences; vol. 54; No. 6; Jun. 2011; pp. 1327-1332.

Jin, et al.; "Adaptive Random Network Coding in WiMAX;" Communications, 2008; ICC'08 IEEE International Conference on May 19-23, 2008; 5 pages.

Jin, et al.; "Is Random Network Coding Helpful in WiMax;" IEEE 27th Conference on Computer Communications; Apr. 2008; 5 pages.

Jolfaei, et al.; "A New Efficient Selective Repeat Protocol for Point-To_Multipoint Communication;" Communications 1993; ICC'93 Genova Technical Program, Conference Record; IEEE International Conference on May 23-26, 1993; vol. 2; pp. 1113-1117.

Karkpinski, et al.; "New Approximation Algorithms for the Steiner Tree Problems;" Technical Report, Electronic Colloquium on Computational Complexity (ECCC) TR95-030; 1995; pp. 1-17.

Karp, et al.; "Randomized Rumor Spreading;" IEEE Proceeding FOCS '00 Proceedings of the 41st Annual Symposium on Foundations of Computer Science; Jan. 2000; pp. 565-574.

Katti, et al.; "XORs in the Air: Practical Wireiess Network Coding;" IEEE/ACM Transactions on Networking; vol. 16; No. 3; 2008; pp. 1-14.

Katti, et al.; "XORs in The Air: Practical Wireless Network Coding;" ACM SIGCOMM '06; Computer Communications Review; vol. 36; Sep. 11-15, 2006; 12 pages.

Kempe, et al.; "Protocols and Impossibility Results for Gossip-Based Communication Mechanisms;" Foundations of Computer Science, Jan. 2002; Proceedings. The 43rd Annual IEEE Symposium; pp. 471-480.

Key, et al.; "Combining Multipath Routing and Congestion Control for Robustness;" In Proceedings of IEEE CISS, 2006, 6 pages.

Kim, et al.; "Modeling Network Coded TCP Throughout: A Simple Model and Its Validation;" VALUETOOLS '11 Proceedings of the 5th International ICST Conference on Performance Evaluation Methodologies and Tools; May 16-20, 2011; 10 pages.

Kim, et al.; "Modeling Network Coded TCP Throughput: A Simple Model and its Validation", Cornell University Library, http://arxiv.org/abs/1008.0420, Aug. 2010, 3 pages.

Kim, et al.; "Network Coding for Multi-Resolution Multicast;" IEEE Infocom 2010; Mar. 2010; 9 pages.

Kim, et al.; "Transform-free analysis of the GI/G/1/K queue through the decomposed Little's formula;" Computers and Operations Research; vol. 30; No. 3; Mar. 2003; pp. 1-20.

Km, et. al.; "Modeling Network Coded TCP Throughput: A Simple Model and its Validation", arXiv: 1008.0420v1 [cs.IT] Aug. 2, 2010; 9 pages.

Kim, et. al.; "Modeling Network Coded TCP Throughput: A Simple Model and its Validation", Nov. 2010, Presentation; 19 pages.

Kodialam, et al.; "Online Multicast Routing With Bandwidth Guarantees: A New Approach Using Multicast Network Flow," IEEE/ACM Transactions on Networking; vol. 11; No. 4; Aug. 2003; pp. 676-686.

Koetter, et al.; "An Algebraic Approach to Network Coding;" IEEE/ACM Transactions on Networking; vol. 11, No. 5; Oct. 2003; pp. 782-795.

Koetter et al.; "Bond Routing: An Algebraic Approach to Network Coding;" IEEE Infocom; 2002; 9 pages.

Koutsenikolas, et al.; "Efficient Online WiFi Delivery of Layered-Coding Media using Inter-layer Network Coding;" Distributed Computing Systems (ICDCS); 2011 31st International Conference on Jun. 2011; 11 pages.

Kritzner, et al.; "Priority Based Packet Scheduling with Tunable Reliability for Wireless Streaming;" Lecture Notes in Computer Science; 2004; pp. 707-717.

Kuhn, et al.; "Distributed Computation in Dynamic Networks," Proc. Of tho 42nd Symposium on Theory of Computing (STOC); Jun. 5-8, 2010; 10 pages.

Lai; "Sequential Analysis: Some Classical Problems and New Challenges"; Statistica Sinica, vol. 11, No. 2; 2001; pp. 303-350.

(56) References Cited

OTHER PUBLICATIONS

Landau; "Application of the Volterra Series to the Analysis and Design of an Angle Track Loop;" IEEE Transactions on Aerospace and Electronic Systems; vol. AES-8, No. 3; May 1972; pp. 306-318.

Larsson, et al.; "Analysis of Network Coded HARQ for Multipie Unicast Flows;" Communication (ICC) 2010 IEEE International Conference on May 23-27, 2010 pp. 1-6.

Larsson, et al.; "Mold-User ARQ;" Vehicular Technology Conference; 2006; VTC (2006-Spring); IEEE $63^{rd}$; vol. 4; May 7-10, 2006; pp. 2052-2057.

Larsson; "Analysis of Multi-User ARQ with Multiple Unicast Flows Under Non-iid Reception Probabillties;" Wireless Communication and Networking Conference 2007; WCNC 2007; IEEE; Mar. 11-15, 2007; pp. 384-388.

Larsson; "Multicast Multiuser ARQ;" Wireless Communications and Networking Conference (WCNC) 2008; IEEE; Apr. 3, 2008; pp. 1985-1990.

Le, et al.; "How Many Packets Can We Encode?—An Analysis of Practicai Wireless Network Coding;" Infocom 2008; The $27^{th}$ Conference on Computer Communications, IEEE; 2008; pp. 1040-1048.

Lee, et al.; "Content Distribution in VANETs using Network Coding: The Effect of Disk I/O and Processing O/H;" Proc. IEEE SECON; Jan. 2008; pp. 117-125.

Lehman, et al; "Complexity Classification of Network Information Flow Problems;" SODA 04' Proceedings of the fifteenth annual ACM-SIAM symposium on Discrete algorithms; Jan. 2004; pp. 9-10.

Li, et al.; "N-in-1 Retransmission with Network Coding;" IEEE Transactions on Wireless Communications; vol. 9; No. 9; Sep. 2010; pp. 2689-2694.

Li, et al.; "Robust and Flexible Scalable Video Multicast with Network Coding over P2P Network;" $2^{nd}$ International Congress on Image and Signal Processing, IEEE: Oct. 17, 2009; pp. 1-5.

Li, et al.; "Linear Network Coding;" IEEE Transactions on Information Theory; vol. 49; No. 2; Feb. 2003; pp. 371-381.

Lima, et al.; "An-Information-Theoretic Cryptanalysis of Network Coding—is Protecting the Code Enough;" International Symposium on Information Theory and its Applications; Dec. 2008; 6 pages.

Lima, et al.; "Random Linear Network Coding: A free cipher?" IEEE International Symposium on Information Theory; Jun. 2007; pp. 1-5.

Lima, et al.; "Secure Network Coding for Multi-Resolution Wireless Video Streaming;" IEEE Journal on Selected Areas in Communications; vol. 28; No. 3; Apr. 2010; pp. 377-388.

Lima, et al.; "Towards Secure Multiresolution Network Coding;" IEEE Information Theory Workshop; Jun. 12, 2009: pp. 125-129.

Liu, et al.; "The Throughput Order of Ad Hoc Networks Employing Network Coding and Broadcasting;" Military Communications Conference; MILCOM 2006; Oct. 2006; pp. 1-7.

Liu, et al.; "Using Layered Video to Provide Incentives in P2P Live Streaming;" P2P-TV07; Proceedings of the 2007 Workshop on Peer-to-peer Streaming and IP-TV; Aug. 31, 2007 ACM; 6 pages.

Luby, et al.; "The Use of Forward Error Correction (FEC) in Reliable Multicast;" Internet Society Request for Comments; RFC 3453; Dec. 2002; 18 pages.

Lucani et al.; "On Coding for Delay New Approaches based on Network Coding in Networks with Large Latency;" Presentation in NetCod; Slide Presentation; Jun. 16, 2009; 17 pages.

Lucani et al; "On Coding for Delay New Approaches based on Network Coding in Networks with Large Latency;" Conference ITA Workshop, San Diego, USA; Slide Presentation; Feb. 13, 2009; 11 pages.

Lucani et al; "Random Linear Network Coding for Time Division Duplexing: Energy Analysis;" Conference: ICC 2009; Dresden, Germany; Jun. 2009; 5 pages.

Lucani et al; "Random Linear Network Coding for Time Division Duplexing: Queuing Analysis;" Conference ISIT 2009, Seoul, Korea; Jul. 2009; 5 pages.

Lucani et al; "Random Linear Network Coding for Time-Division Duplexing: Field Size Considerations;" Conference: Globecom 2009; Hawaii, USA; Dec. 2009; 6 pages.

Lucani, et al.; "Network Coding for Data Dissemination: It Is Not What You Know, But What Your Neighbors Don't Know;" Modeling and Optimization in Mobile, AdHoc, and Wireless Networks 2009; WIOPT 2009; $7^{th}$ International Symposium on Jun. 23-27, 2009; pp. 1-8.

Lucani, et al.; "Network Coding Schemes for Underwater Networks;" WUWNet 07; Sep. 14, 2007; pp. 25-32.

Lucani, et al.; "Systematic Network Coding for Time-Division Duplexing;" Proceedings of the IEEE International Symposium on Information Theory (ISIT); ; Jun. 13-18, 2010; pp. 2403-2407.

Lun, et al.; "Further Results on Coding for Reliable Communication over Packet Networks;" Information Theory, ISIT 2005 Proceedings International Symposium on Sep. 4-9, 2005; 5 pages.

Lun, et al.; "On Coding for Reliable Communication Over Packet Networks;" Physical Communication; vol. 1; No. 1; Jan. 2008; pp. 10 pages.

Lun, et al.; "On Coding for Reliable Comunication over Packet Networks;" LIDS Publication #2741; Jan. 2007; 33 pages.

Lun, et al.; An Analysis of Finite-Memory Random Linear Coding on Packet Streams; Modeling and Optimization in Mobile, Ad Hoc and Wireless Networks; Apr. 3-6, 2006; pp. 1-6.

Lun; "Efficient Operation of Coded Packet Networks;" Ph.D. Dissertation; Massachusetts Institute of Technology; Jun. 2006; 130 pages.

Magli, et al.; "An Overview of Newtwork Coding for Multimedia Streaming;" IEEE International Conference; Jun. 28, 2009; pp. 1488-1491.

Mallat, et al.; "Adaptive Convariance Estimation of Locally Stationary Processes;" Annals of Statistics, vol. 26, No. 1; 1998; pp. 1-43.

Manssour, et al.; "A Unicast Retransmission Scheme based on Network Coding;" IEEE Transactions on Vehicular Technology; vol. 61; Issue 2; Nov. 2011; 7 pages.

Maymounkov, et al.; "Methods for Efficient Network Coding;" Proc. Of the $44^{th}$ Allerton Conference on Communication, Control, and Computing; Sep. 2006; 10 pages.

Médard, et al.; "On Coding for Non-Multicast Networks;" invited paper, $41^{st}$ Allerton Annual Conference on Communication, Control; Outgrowth of supervised student research Publications of Muriel Médard and Computing; vol. 1; Oct. 2003; 9 pages.

Medard; "Some New Directions for Network Coding in Content Distribution", RLE, EECS, MIT, Seminar to Alcatel Lucent, Nov. 2010, 29 pages.

Merchant, et al.; "Analytical Modeling of Clustered RAID with Mapping Based on Nearly Random Permutation;" IEEE Transactions on Computers; vol. 45; No. 3; Mar. 1996; pp. 367-373.

Metzner; "An Improved Broadcast Retransmission Protocol;" IEEE Transactions on Communications; vol. COM-32; No. 6; Jun. 1984; pp. 679-683.

Mosk-Aoyama, et al.; "Information Dissemination via Network Coding;" ISIT 2006; IEEE; Jul. 9-14, 2006; pp. 1748-1752.

Moyer, et al.; "A Survey of Security Issues in Multicast Communications;" IEEE Network; vol. 13; No. 6; Nov./Dec. 1999; pp. 12-23.

Nguyen, et al.; "Internet Media Streaming Using Network Coding and Path Diversity;" IEEE Global Telecommunications Conference; Nov. 30-Dec. 4, 2008; 5 pages.

Nguyen, et al.; "Wireless Broadcast Using Network Coding;" Vehicular Technology IEEE Transactions on Feb. 2009; vol. 58; Issue 2; 25 pages.

Nguyen, et al; "Video Streaming with Networking Coding;" Journal of Signal Processing Systems; vol. 59, Issue 3: DOI: 10.1007/s11265-009-0342-7; Jun. 2010; 25 pages.

Nobel; "Hypothesis Testing for Families of Ergodic Processes;" Bernoulli-London, vol. 12, No. 2; 2006; 21 pages.

Noguchi, et al.; "Performance Evaluation of New Multicast Architecture with Network Coding;" IEICE Transactions on Communication, E86-B; No. 6; Jun. 2003; 3 pages.

NS Version 1—LBNL Network Simulator; web page—http://ee.lel.gov/ns/; Mar. 21, 2011; 3 pages.

Nyandoro, et al.; "Service Differentiation in Wireless LANs based on Capture;" IEEE Globecom 2005; vol. 6; Dec. 2005; 5 pages.

Oliveira, et al.; "A Network Coding Approach to Secret Key Distribution;" IEEE Transactions on Information Forensics and Security; vol. 3; No. 3; pp. 414-423; Sep. 2008.

(56) References Cited

OTHER PUBLICATIONS

ParandehGheibi, et al.; "Access-Network Association Policies for Media Streaming in Heterogeneous Environments;" Apr. 2010; pp. 1-8.
Peng, et al.; "Research on Network Coding based Hybrid-ARQ Scheme for Wireless Networks;" Communication Systems (ICCS); 2010 IEEE International Conference on Nov. 17-19, 2010; pp. 218-222.
Popvici, et al.; "Robust, Portable I/O Scheduling with the Disk Mimic;" Proc. USENIX Annual Tech. Conf. San Antonio, Texas, Jun. 2003; 14 pages.
Quereshi, et al.; "An Efficient Network Coding based Retransmission Algorithm for Wireless Multicast;" Personal, Indoor and Mobile Radio Communications, 2009 IEEE $20^{th}$ International Symposium on Sep. 13-16, 2009; 5 pages.
Radunovic, et al.; "Horizon: Balancing TCP Over Multiple Paths in Wireless Mesh Network;" Proc. $14^{th}$ ACM International Conference on Mobile Computing and Networking; Sep. 2008; 12 pages.
Ramanathan; "Multicast Tree Generation in Networks with Asymmetric Links;" IEEE Transactions on Networking; vol. 4; Aug. 1996; pp. 1-12.
Rezaee, et al.; "Multi Packet Reception and Network Coding;" Presentation at The 2010 Military Communications Conference Unclassified Technical Program; Nov. 2, 2010; 15 pages.
Rezaee, et al.; "An Analysis of Speeding Multicast by Ackowledgment Reduction Technique (SMART) with Homogeneous and Heterogeneous Links—A Method of Types Approach;" Signals, Systems and Computers (ASILOMAR) 2011 Conference; IEEE; Nov. 2011; pp. 21-27.
Rezaee, et al.; "Speeding Multicast by Acknowledgment Reduction Technique (SMART);" ArXiv:1104.2941v2 [cs.NI] Sep. 10, 2011; 6 pages.
Rezaee, et al.; "Speeding Multicast by Acknowledgment Reduction Technique (SMART) Enabling Robustness of QoE to the Number of Users;" IEEE Journal on Selected Areas in Communication; vol. 30, No. 7; Aug. 2012; pp. 1270-1280.
Rezaee, et.al.; "Multi Packet Reception and Network Coding;" Military Communications Conference; 2010; MILCOM 2010; IEEE; Oct. 31, 2010-Nov. 3, 2010; pp. 1393-1398.
Rezaee; "Network Coding, Multi-Packet Reception, and Feedback: Design Tools for Wireless Broadcast Networks;" Submitted to Department of Electrical Engineering and Computer Science at Massachusetts Institute of Technology; Sep. 2011; 92 pages.
Riemensberger, et al.; "Optimal Slotted Random Access in Coded Wireless Packet Networks;" WiOPt 10: Modeling and Optimization in Mobile, Ad Hoc, and Wireless Networks; Jul. 13, 2010; pp. 374-379.
Roughgarden, et al.; "How Bad is Selfish Routing?" Journal of the ACM; vol. 49, No. 2; Mar. 2002; pp. 236-259.
Ruemmler, et al.; "An introduction to disk drive modeling;" IEEE Computers; vol. 27; No. 3; Mar. 17-29, 1994; 17 pages.
Ryabko, et al.; "On Hypothesis Testing for Ergodic Processes;" Information Theory Workshop; ITW'08; IEEE; 2008; pp. 281-283.
Sanders, et al.; "Polynomial Time Algorithms for Network Information Flow;" $15^{th}$ ACM Symposium on Parallel Algorithms and Architectures; Jun. 2003; pp. 1-9.
Sayenko, et al.; "Performance Analysis of the IEEE 802.16 ARQ Mechanism;" MSWiM'07; Oct. 22-26, 2007; pp. 314-322.
Scharf; "MPTCP Application Interface Considerations draft-scharf-mptcp-ap-04;" Internet Engineering Task Force; Internet-Draft; Nov. 22, 2010; 26 pages.
Seferoglu, et al.; "Opportunistic Network Coding for Video Streaming over Wireless;" Packet Video; Nov. 2007; 10 pages.
Sengupta, et al.; "An analysis of Wireless Network Coding for Unicast Sessions: The Case for Coding-Awara Routing;" in Infocom 2007; $26^{th}$ IEEE International Conference on Computer Communications; Jun. 2007; 9 pages.
Servetto, et al.; "Constrained Random Walks on Random Graphs: Routing Algorithms for Large Scale Wireless Sensor Networks;" WSNA 02; Sep. 28, 2008; 10 pages.
Shenker, et al.; "Pricing in computer networks: reshaping the research agenda;" Telecommunications Policy; vol. 20, No. 3; Jan. 1996; pp. 183-201.
Sherali, et al.; "Recovery of primal solutions when using subgradient optimization methods to solve Lagrangian duals of linear programs;" Elsevier Operations Research Letteres 19 (Jan. 1996); pp. 105-113.
Shields; "The Interactions Between Ergodic Theory and Information Theory;" IEEE Transactions on Information Theory, vol. 14, No. 6; Oct. 1998; pp. 2079-2093.
Shrader, et al.; "Systematic wireless network coding;" Military Conference, 2009; MILCOM 2009; IEEE; 7 pages.
Shrader, et al; "Routing and Rate Control for Coded Cooperated in a Satellite—Terrestrial Network;" IEEE: The 2011 Military Communications Conference—Track 2—Network Protocols and Performance Nov. 7-10, 2011; pp. 735-740.
Shriver, et al.; "An analytic behavior model for disk drives with readahead caches and request reordering;" Proc. SIGMETRICS/Performance, Joint Conf. on Meas. and Modeling Comp. Sys.; ACM; Jan. 1998; 10 pages.
Song, et al.; "Zero-Error Network Coding for Acyclic Networks;" IEEE Transactions on Information Theory; vol. 49, No. 12; Dec. 2003; pp. 3129-3139.
SongPu, et al.; Performance analysis of joint chase combining and network coding in wireless broadcast retransmission; Wireless Communication, Network and Mobile Computing 2008; WiCOM '08, $4^{th}$ International Conference on Oct. 12-14, 2008; pp. 1-4.
Soo Suh; "Send-On-Delta Sensor Data Transmission With a Linear Predictor;" Sensors; ISSN 1424-8220; vol. 7; No. 4; Apr. 26, 2007; pp. 537-547.
Sun, et al.; "Cooperative Hybrid-ARQ Protocol with Network Coding;" Communications and Networking in China 2009—ChinaCOM 2009; Fourth International Conference on Aug. 26-28, 2009; pp. 1-5.
Sundaram, et al.; "Multirate Media Streaming Using Network Coding;" Proc. $43^{rd}$ Allerton Conference on Communication, Control, and Computing; Sep. 2005; 7 pages.
Sundararajan, et al.; "ARQ for Network Coding;" ISIT Proc. Of the IEEE International Symposium on Information Theory (ISIT); Jul. 6-11, 2008; pp. 1651-1655.
Sundararajan, et al.; "Network Coding Meets TCP: Theory and Implementation;" Proceedings of the IEEE; vol. 99; Issue 3; Mar. 2011; pp. 490-512.
Sundarajan, et al.; "Network coding meets TCP;" Infocom 2009; IEEE, Apr. 19-25, 2009; pp. 280-288.
Sundararajan, et al.; On Queueing in Coded Networks—Queue Size Follows Degrees of Freedom; IEEE Information Theory Workshop on Information Theory for Wireless Networks (ITW); Jul. 1-6, 2007; 6 pages.
Teerapittayanon, et al.; "Network Coding as a WiMAX Link Reliability Mechanism;" Multiple Access Communication; Lectures Notes in Computer Science; vol. 7642; pp. 1-12; 2012.
Teerapittayanon, et al.; "Performance Enhancements in Next Generation Wireless Networks Using Network Coding: A Case Study in WiMAX;" Massachusetts Institute of Technology; Jun. 2012; 130 pages.
Thobaben; "Joint Network/Channel Coding for Multi-User Hybrid-ARQ;" Source and Channel Coding (SCC) 2008; $7^{th}$ International ITG Conference on Jan. 14-16, 2008; 6 pages.
Tosun, et al.; "Efficient Multi-Layer Coding and Encryption of MPEG Video Streams;" Proc. 2000 IEEE International Conference on Multimedia and Expo; vol. 1; 2000; pp. 119-122.
Tosun, et al.; "Lightweight Secutiry Mechanisms for Wireless Video Transmission;" Proc. Intl. Conference on Information Technology, Coding and Computing; Apr. 2001; pp. 157-161.
Tran, et al.; "A Hybrid Network Coding Technique for Single-Hop Wireless Networks;" IEEE Journal on Selected Areas in Communications; vol. 27; No. 5; Jun. 2009; pp. 685-698.
Tran, et al.; "A Joint Network-Channel Coding Technique for Single-Hop Wireless Networks;" Network Coding, Theory and Applications; 2008; NetCod 2008; Fourth Workshop on Jan. 3-4, 2008; pp. 1-6.
Trung, et al.; "Quality Enhancement for Motion JPEG Using Temporal Redundancies;" IEEE Transactions on Circuits and System for Video Technology, vol. 18; No. 5; May 2008; pp. 609-619.

(56) References Cited

OTHER PUBLICATIONS

Tsatsanis, et al.; "Network Assisted Diversity for Random Access Wireless Data Networks;" Signals, Systems & amp; Computers; IEEE; vol. 1; Nov. 1-4, 1988; pp. 83-87.

Valancius, et al.; "Greening the Internet with Nano Data Centers;" Proc. 5th International Conference on Emerging Networking Experiments and Technologies; CoNEXT 2009; ACM 2009; Dec. 1-4, 2009; pp. 37-48.

Vasudevan, et al.; "Algebraic Gossip on Arbitrary Networks;" arXiv:0901.1444; Jan. 2009; 5 pages.

Velambi, et al.; "Throughput and Latency in Finite-Buffer Line Networks;" IEEE Transactions on Information Theory; vol. 57; No. 6; Jun. 2011; pp. 3622-3643.

Vien, al.; "Network Coding Based Block ACK for Wireless Relay Networks;" Proceedings of IEEE Vehicular Technology Conference (VTC2011-Spring); May 2011; 5 pages.

Vien, et al.; "Network Coding-based ARQ Retransmission Strategies for Two-Way Wireless Relay Networks;" Software, Telecommunications and Computer Networks (SoftCOM) 2010; International Conference on Sep. 23-25, 2010; 5 pages.

Vilela, et al.; "Lightweight Security for Network Coding;" IEEE International Conference on Communications; May 2008; 5 pages.

Wang, et al.; "Capicity-Delay Tradeoff for Information Dissemination Modalities in Wireless Networks;" in Information Theory; ISIT 2008; IEEE International Symposium; Jul. 2008; pp. 677-681.

Wang, et al.; "Embracing Interference in Ad Hoc Networks Using Joint Routing and Scheduling with Multiple Packet Reception;" in Infocom 2008; The 27th Conference on Computer Communications; IEEE; Apr. 2008; pp. 1517-1525.

Wang, et al.; Multipath Live Streaming via TCP: Scheme, Performance and Benefits; ACM Transactions on Multimedia Computing, Communications and Applications; vol. 5; No. 3; Article 25; Aug. 2009; pp. 1-23.

Widmer, et al.; "Network Coding for Efficient Communication in Extreme Networks;" Applications, Technologies, Architectures, and Protocols for Computer Communication; Aug. 2005; pp. 284-291.

Wieselthier, et al.; "Energy Efficient Broadcast and Multicast Trees in Wireless Networks;" Mobile Networks and Applications 7; Jan. 2002; pp. 481-492.

Wieselthier, et al.; "Energy-Aware Wireless Networking with Directional Antennas: The Case of Session-Based Broadcasting and Multicasting;" IEEE Transactions on Mobile Computing; vol. 1, No. 3; Jul.-Sep 2002; pp. 176-191.

Wilhelm; "An Anomaly in Disk Scheduling: A Comparison of FCFS and SSTF Seek Scheduling Using an Empirical Model for Disk Access;" Communications of the ACM, vol. 19; No. 1; Jan. 1976; pp. 13-17.

Wu, et al.; "A Trellis Connectivity Analysis of Random Linear Network Coding with Buffering;" Proc. Of the International Symposium on Information Theory (ISIT); Jul. 9-14, 2006; pp. 768-772.

Yazdi, et al.; "Optimum Network Coding for Delay Sensitive Applications in WiMAX Unicast;" IEEE INFOCOM 2009; Apr. 19-25, 2009; pp. 1576-2580.

Yeung; "Multilevel Diversity Coding with Distortion;" IEEE Transactions on Information Theory; vol. 41, No. 2; Mar. 1995; pp. 412-422.

Yong, et al.; "XOR Retransmission in Multicast Error Recovery;" Networks 2000; ICON; Proceedings IEEE International Conference on Sep. 5-8, 200; pp. 336-340.

Yun et al.; "High-Throughput Random Access Using Successive Interference Cancellation in a Tree Algorithm;" IEEE Transaions on Information Theory; vol. 53; No. 12; Dec. 2007; pp. 4628-4639.

Yun, et al.; Towards Zero Retransmission Overhead: A Symbol Level Network Coding Approach to Retransmission; IEEE Transactions on Mobile Computing; vol. 10, No. 8; Aug. 2011; pp. 1083-1095.

Zeger; "Packet Erasure Coding with Random Access to Reduce Losses of Delay Sensitive Multislot Messages;" IEEE; Paper ID #900482; Aug. 18, 2009; pp. 1-8.

Zhang, et al.; "Collision Resolution in Packet Radio Networks Using Rotational Invariance Techniques;" IEEE Transactions on Communication; vol. 50; No. 1; Jan. 2002; pp. 146-155.

Zhang, et al.; "Optimized Multipath Network Coding in Loss Wireless Networks;" ICDCS '08 Proceedings of the 2008 The 28th International Conference on Disputing Computing Systems; Jan. 2008; 12 pages.

Zhang, et al.; Dual XOR in the AIR: A Network Coding Based Retransmission Scheme for Wireless Broadcasting, Communications (ICC) 2011 IEEE International Conference on Jun. 5-9, 2011; pp. 1-6.

Zhao, et al.; "A Multiqueue Service Room MAC Protocol for Wireless Networks With Multipacket Reception;" IEEE/ACM Transactions on Networking; vol. 11; No. 1; Feb. 2003; pp. 125-137.

Zhao, et al.; "On analyzing and improving COPE performance;" Information Theory and Applications Workshop (ITA), Jan. 2010; pp. 1-6.

Zhu, et al.; "Multicast with Network Coding in Application-Layer Overlay Networks;" IEEE Journal on Selected Areas in Communications; vol. 22; No. 1; Jan. 2004; pp. 1-13.

\* cited by examiner

CODING APPROACH FOR A ROBUST AND FLEXIBLE COMMUNICATION PROTOCOL

GOVERNMENT RIGHTS

This invention was made with government support under Grant No. 6915101, awarded by Defense Advanced Research Projects Agency (DARPA). The government has certain rights in this invention.

FIELD OF THE INVENTION

The concepts described herein relate to communication protocols and more particularly to a coding approach for network communication protocols.

CROSS REFERENCE TO RELATED APPLICATIONS

Not applicable.

BACKGROUND OF THE INVENTION

As is known in the art, there have been several past attempts in using multiple paths for transport protocols, all of which consider end-to-end connection from a single server to a single client. For example, one of the latest such protocols introduced is Multi-Path Transmission Control Protocol (MPTCP).

Implementation of MPTCP can significantly improve the way current computer networks operate by using the resource pooling principle to improve the reliability and throughput of a data communication session. For example, if a communication path between a source and a destination breaks down, or becomes highly congested, data may be sent over alternative paths to thereby avoid any interruption in the data communication session. Moreover, MPTCP potentially enables a client, e.g. a mobile device, to simultaneously establish a connection through multiple interfaces.

Such interfaces can provide connections to a cellular network, wired and wireless Local Area Network (LAN), or other devices in an ad-hoc or peer-to-peer mode. This potentially provides robustness to link failures particularly in wireless networks as well as the ability to roam from one network to another.

Even though the desire for such benefits has increased with the emergence of more capable (in terms of computational power and communication interfaces) devices, current implementation suggestions by the Internet Engineering Task Force (IETF) working group have several issues.

For example, one problem in MPTCP is scheduling. The problem of scheduling in MPTCP involves partitioning the data across multiple paths, and dynamically re-adjusting the schedule based upon congestion feedback. Consider, for example, an MPTCP session with two paths. One may choose to assign odd-numbered packets to the first path, and the even-numbered packets to the second path. If the second path is congested and the first path is not, a delay may occur. If MPTCP does not re-adjust the load based upon congestion levels in each path, then the odd-numbered packets will be delivered (via the first path) while the even-numbered packets will delay the file transfer, (i.e. the second path is a bottleneck). Therefore, MPTCP has to dynamically re-adjust the load. However, this involves a delicate and complex control. For example, decisions must be made as to which fraction of the even-packets should be rescheduled to the first path, and how to notify the receiver of the new load balancing decisions, etc.

It would therefore, be desirable to provide one or more methods to facilitate the implementation of a multi-path protocol. It would be further desirable to provide one or more methods to facilitate the implementation of a transport protocol that can emulate current Transfer Control Protocol (TCP)/MPTCP interface (to higher and lower layers) and provide a more effective service.

SUMMARY OF THE INVENTION

In accordance with the concepts, systems and techniques herein, described are several methods to facilitate the implementation of a system and technique which uses a coded protocol and is suitable for use as a communication protocol including a multipath communication protocol. In one embodiment, the coded protocol may be implemented as a multi-path transport protocol that can emulate current TCP/MPTCP interface (to higher and lower layers) and provide a more effective service. When implemented at the transport later, the coded protocol technique described herein is referred to as Coded Transmission Control Protocol (CTCP).

It should be appreciated that even though the concepts, systems and techniques are sometimes described herein in the context of a transport protocol, the same concepts, systems and techniques may also be implemented in an application layer e.g. when an unreliable transport protocol such as the User Datagram Protocol (UDP) is in place, or in a link layer.

In accordance with the concepts, systems and techniques described herein, a communication protocol includes a method of delivering data (including but not limited to voice, image and video data) from a source to a destination by forming coded packets as a linear combination of original packets at the source and delivering the same coded packets to the destination over one or more network paths. The coded packets represent the data to be transmitted and no additional coding of the data is done between the source and destination.

With this particular arrangement a coding approach for a robust and flexible network communication protocol is provided. By using coding, it is possible to eliminate the need to track packet identities, and hence, it is possible to reduce coordination overhead associated with many conventional protocols. The concepts, systems and techniques described herein takes advantage of multiple paths, interfaces, mediums, servers, and storage locations available in a network. This allows one to provide a reliable service that is robust against failures. The coded protocol and related techniques allow quick response to congestion by load balancing over different network resources. The protocol and techniques also enable soft vertical hand-overs across heterogenous networks.

In one embodiment, the communication protocol further includes providing feedback from the destination to the source and based upon the feedback from the destination, forming a new linear combination of the original packets at the source and delivering the new coded packets from the source to the destination.

By utilizing feedback between the destination and source, different coded packets are repeatedly delivered until all of the original information (i.e. the data being delivered from the source to the destination) is received at the destination. In this manner, the communication protocol described herein guarantees delivery of all data.

In accordance with a further aspect of the concepts, systems and techniques herein, a transport protocol based on network coding for reliable data delivery includes a method of transmitting data from a source node to a destination node by forming a linear combination of packets at the source node and delivering the same linear combination of packets formed at the source node from the source node to the destination node over one or more network paths. The linear combinations of packets (coded packets) represent the data to be transmitted and no additional coding of the data is done between the source node and the destination node.

With this particular arrangement, a transport protocol based upon network coding for reliable data delivery is described. In one embodiment, a media file is divided into chunks and the transport protocol described herein is tailored to meet delay requirements of media streaming applications. Also described are different coding strategies for chunk delivery based upon an urgency level of each chunk. In one embodiment, a method and system based on network coding for design and implementation of a reliable transport protocol in a network is described. The transport protocol takes advantage of multiple paths, interfaces, and servers available in the network. This allows one to provide a reliable service that is robust against failures and can satisfy quality of service (QoS) requirements of delay sensitive applications such as video streaming. The transport protocol described herein allows quick response to congestion by load balancing over different network resources. The transport protocol and techniques described herein also enable soft vertical hand-over across heterogenous networks.

In one embodiment, the transport protocol technique further includes providing feedback from the destination node to the source node and then forming a new linear combination of packets at the source node and delivering the new combination of packets from the source node to the destination node.

In one embodiment, the process is repeated until all of the original data is decoded at the source node.

In one embodiment, the source is a server and the destination is a client.

In one embodiment, the plurality of packets represent a file.

In one embodiment, the technique is implemented in one of: a link layer, a transport layer; and an application layer.

In one embodiment, forming a linear combination of packets includes generating a linear combination of packets at random or deterministically.

In some embodiments, the linear combination of packets comprises all packets which make up the file and in other embodiments the linear combination of packets comprises a subset of the packets which make up the file.

In some embodiments, forming a linear combination of packets is done by forming a random linear combination of a subset of packets and in other embodiments, forming a linear combination of packets is done by choosing the coding coefficients deterministically. The subset of packets chosen to form linear combinations can be obtained in a deterministic or probabilistic fashion.

In some embodiments the coefficients of the linear combination are embedded within a payload.

In accordance with a still further aspect of the concepts, systems and techniques described herein, it should be appreciated that there exist scenarios in which where a client-device (e.g. a wireless mobile device) may not be able to connect simultaneously to two access points. This could be due to hardware constraints, such as the client-device having a single WiFi card thereby limiting the client-device to be associated with a single WiFi access point at any given point in time. This may pose a challenge to soft-handoff between two access points.

Thus, the coded protocol concepts, systems and/or techniques described may be used to form a method of soft-handoff where there is an intermediate means of access available between two access points. In one embodiment, first and second different access points utilize first and second WiFi networks and an intermediate means of access corresponds to a 3G or a 4G network. Even though the client-device may not be able to simultaneously establish two WiFi connections, the coded protocol concepts, systems and techniques described herein, allow the client-device (e.g. a mobile device) to seamlessly transfer a connection from the first WiFi network to the intermediate 3G (or 4G) network and then from the intermediate 3G (or 4G) network to the second WiFi network. In this manner, a data transfer session will be uninterrupted when client-devices move from the first access point (i.e. the first WiFi network) to the second access point (i.e. the second WiFi network).

In accordance with a still further aspect of the concepts, systems and techniques described herein, in a communication system in which a client-device cannot connect to a server simultaneously through first and second access points, a method for transferring an ongoing data session between the first and second access points includes establishing a first connection between the client-device and the server via the first access point, and establishing a second connection between the client-device and server via an intermediate access point wherein at least one of the connections between the first and second access points is provided via a coded protocol.

With this particular arrangement, a communication system is provided in which a client-device can connect to a server through first and second access points via an intermediate access point, wherein each of the first and second access points and intermediate access point are implemented with the same or different access technologies.

Once the second connection is established between the client-device and server via the intermediate access point, in one embodiment, the method further includes terminating the first connection through the first access point. The method can then further include establishing a third connection between the client-device and the server via a third access point. It should be appreciated that at least one of the connections between the first and second access points is provided via a coded protocol.

In one embodiment a first one of the first access point, the second access point and the intermediate access point utilizes one of WiFi access technology, Bluetooth access technology, 3G access technology or 4G access technology.

In accordance with a further aspect of the communication protocol concepts, systems and techniques described herein, a method for transmitting a file between one or more servers and one or more clients includes (a) for M information packets, generating $N_M$ linear coded packets at one of the one or more servers, (b) delivering the $N_M$ linear coded packets from the server to one of the one or more clients, (c) upon reception of the some of the $N_M$ linear coded packets at the client, occasionally but continuously providing feedback from the client to the server from which packets were received, (d) based upon the feedback from the client, forming a new linear combination of coded packets at the server and (e) delivering the new combination of coded packets from the server to the client.

With this particular arrangement, an efficient and robust method for transmitting a file between one or more servers and one or more clients is provided. The sequence of providing feedback from the client to the server and sending new coded packets from the server based upon the feedback is continued until the entire original file is decoded at the client. In one embodiment, the packets are delivered by transmitting $N_M$ linear coded packets having a fixed packet size.

In accordance with a still further aspect of the concepts, systems and techniques described herein, a method for transmitting original information between one or more sources and one or more destinations includes (a) for M information packets, generating $N_M$ linear coded packets at one of the one or more servers, wherein the M information packets represent all of the original information to be transmitted from at least one of the one or more sources to one of the one or more destinations, (b) delivering the $N_M$ linear coded packets from the source to one of the one or more destinations, (c) upon reception of some of the $N_M$ linear coded packets at the destination, providing feedback from the destination, (d) based upon the feedback provided from the destination to the source, forming a new linear combination of coded packets at the source and (e) delivering the new combination of coded packets from the source to the destination. The sequence of providing feedback from the destination to the source and forming and resending coded packets at the source is continued until the entire original file is decoded at the destination.

With this particular arrangement, a transport protocol which facilitates the implementation of a multi-path transport protocol that can emulate current TCP/MPTCP interface (to higher and lower layers) and provide a more effective service is provided. By using network coding, it is possible to eliminate the need to track the identity of each packet, and hence, it is possible to remove the coordination overhead associated with many conventional transport protocols. The proposed method takes advantage of multiple paths, interfaces, mediums, servers, and storage locations available in the network. This allows one to provide a reliable service that is robust against failures.

The proposed protocol allows quick response to congestion by load balancing over different network resources. The method also enables soft vertical hand-over across heterogenous networks. This transport protocol can be tailored to meet the delay requirements of media streaming applications, by dividing the media file into small chunks. Different coding strategies for chunk delivery based upon an urgency level of each chunk may also be used.

It should be appreciated that even though the concepts, systems and techniques described are presented as a transport protocol, after reading the disclosure provided herein, it should be understood that the same communication protocol concepts, systems and techniques may be implemented in other layers of a networking protocol suite including but not limited to an application layer or a link layer.

Thus, it should be understood that the coding techniques and control methods described herein are not limited to implementation in the transport layer of a network protocol stack. Rather, the proposed concepts and techniques may be implemented in other layers such as the physical layer, link layer, network layer, and application layer. Moreover, depending upon the layer in which the method described herein is implemented, the size of the data units (packets) and the time scale of the coding operations may vary. Nevertheless, concepts and advantages described herein such as soft vertical-handoff, dynamic load balancing, and ability to maintain multiple connections simultaneously across different interfaces still apply.

Implementing the techniques described herein in the application layer can be achieved by, for instance, tunneling the traffic over a UDP connection. All the coding operations and the control algorithm are performed at the application layer on top of UDP. In this setup, the coding operation is performed in an end-to-end manner, similar to using CTCP at the transport layer.

Another example involves coding at the link layer. Since link layer manages each link individually, the coding operation implemented at the link layer is also on a per-link basis, and is no longer performed in an end-to-end manner. Again, this approach enables seamless connection and hand-over across multiple access technologies such as WiFi, LTE, WiMax, HSPA, etc. . . .

BRIEF DESCRIPTION OF THE DRAWINGS

The foregoing features of this invention, as well as the invention itself, may be more fully understood from the following description of the drawings in which:

FIG. 4A is an example of a transition strategy in which a source continues to transmit coded packets from a current block (chunk) until enough degrees of freedom are acknowledged by a source;

FIG. 4B is an example of a transition strategy in which a source begins sending coded packets from the next block and if any packet loss is detected, the source retransmits a coded packet for the corresponding block;

FIG. 4C is an example of a transition strategy in which a source begins sending coded packets and a transition is deferred until the end of the next block at which point the source sends coded packets from both blocks.

DETAILED DESCRIPTION OF ILLUSTRATIVE EMBODIMENTS

Figure 1:
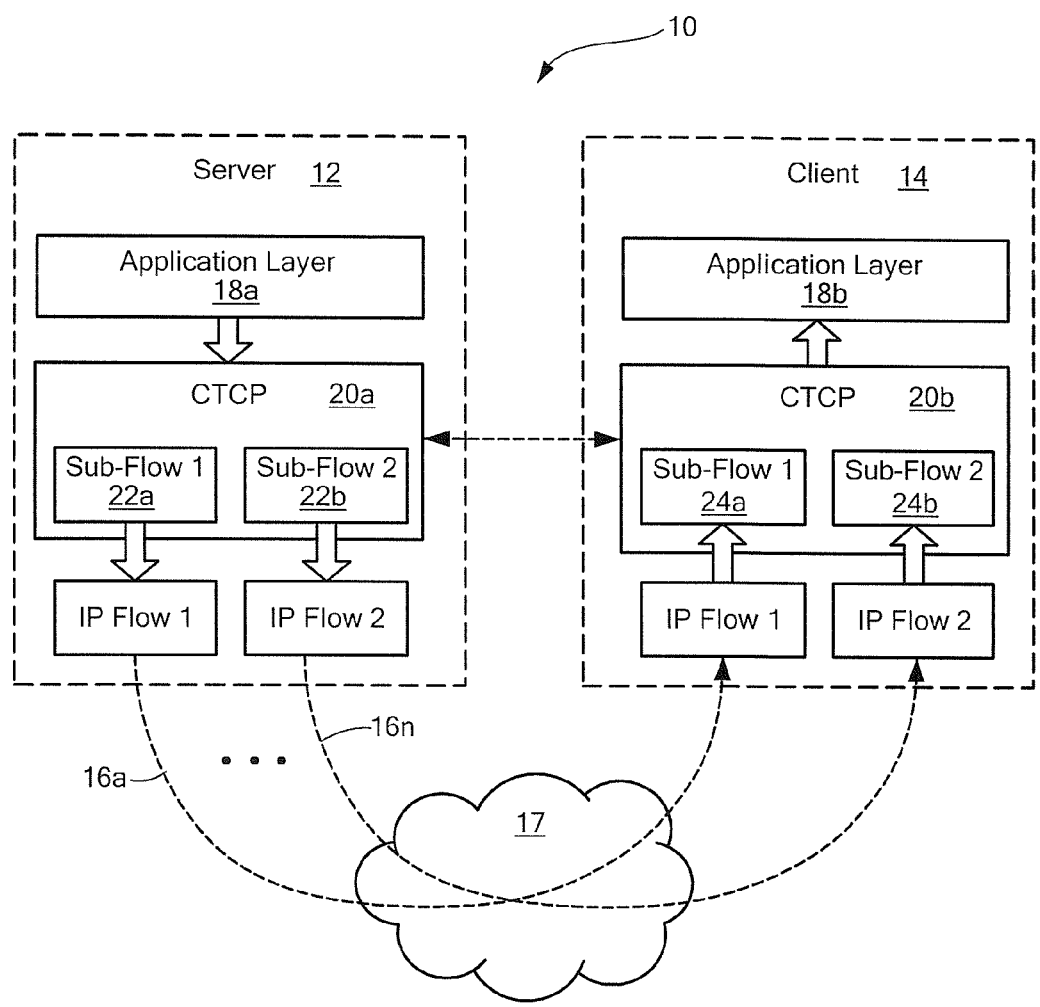
FIG. 1 is a block diagram of a coded transmission control protocol (CTCP) in a protocol stack for a single connection between a server and a client through one or more network paths/interfaces. The IP addresses of the CTCP subflows can be the same or different.

Before describing a robust and flexible network communication protocol and methods, some introductory concepts and terminology are explained.

Reference is sometimes made herein to "data." As used herein, data can include any type of data including, but not limited to voice, image and video. Thus, reference made herein to a "data session" is not limited to any particular type of data.

It should be understood that reference is also sometimes made herein to implementation of a protocol on a specific network layer or layers including, but not limited to: transport layers, link layers and application layers. In one exemplary embodiment described herein, a so-called Coded Transmission Control Protocol (CTCP) is described at the transport layer. Such reference is not intended as, and should not be construed as limiting of the communication coded protocol concepts described herein. Rather, such references and examples are given merely to promote clarity in the description of the coded protocol concepts described herein.

Accordingly, it should be understood that the coding system and techniques and control methods described herein are not limited, for example, to implementation in a transport layer of the network protocol stack. Rather, the proposed concepts and techniques may be implemented in other layers such as the physical layer, link layer, network layer, and application layer. Moreover, depending upon the layer in which the method described herein is implemented, the size of the data units (packets) and the time scale of the coding operations may vary. Nevertheless, concepts and advantages described herein such as soft vertical-handoff, dynamic load balancing, and ability to maintain multiple connections simultaneously across different interfaces still apply.

It may be desirable, for example, to implement the coded protocol techniques described herein in an application layer when an unreliable or undesirable transport protocol is in place. For example, when a network operates with the User Datagram Protocol (UDP), it may be desirable to implement the coded protocol technique in an application layer. Implementing the coded communication protocol techniques described herein in the application layer can be achieved, for instance, by tunneling the traffic over a UDP connection. In such an embodiment, all coding operations and control techniques are performed at the application layer on top of UDP. In such an arrangement, the coding operation is performed in an end-to-end manner (similar to using CTCP at the transport layer as mentioned above). The manner in which such an arrangement may be implemented will be understood by those of ordinary skill in the art.

Another example involves coding at the link layer. Since link layer manages each link individually, the coding operation implemented at the link layer is also on a per-link basis, and is no longer performed in an end-to-end manner. Again, one may achieve seamless connection and hand-over across multiple access technologies such as WiFi, LTE, WiMax, HSPA, etc. . . . with a link layer implementation of the concepts described herein.

Determining where (i.e. on which layer) to implement the coded communication protocol described herein depends upon a variety of factors including but not limited to delay constraints, hardware constraints, software constraints, which layers are accessible for changes/modifications, ease of integration to existing system, It should be understood that in any particular application, these factors may be weighted differently (i.e. some factors may be more important in one case and the same factors may be less important in another case). In any given application, one of ordinary skill in the art will understand how to evaluate such factors and select the particular layer or layers in which to implement the coded protocol described herein. Thus, it should be understood that in some applications it may be desirable to implement the coded protocol techniques described herein in a physical layer or a link layer while in other applications it may be desirable to implement the coded protocol techniques in the transport layer or application layer.

Referring now to FIG. 1, a client-server system 10 includes a server 12 coupled to a client 14 through one or more paths 16a-16n portions of which paths may include the Internet. Server 12 and client 14 each include application layers 18a, 18b which operate in accordance with a coded transmission control protocol within a protocol stack (i.e. a software implementation of a computer networking protocol suite) 20a, 20b respectively. Thus FIG. 1 illustrates a coded transmission control protocol (CTCP) as the transport layer 20c, 20b for a single connection between a server 12 and a client 14. The IP address of the CTCP subflows can be the same or different. As is known, individual protocols typically exist within a suite.

Consider now the following scenario of transmitting a single file from server 12 to client 14. The CTCP protocol establishes multiple sub-flows, which can use possibly different ones of network paths 16a-16n.

For the given file, conventional multipath transmission control protocol (MPTCP) needs to map each byte or packet to different subflows 22a . . . 22n (e.g. as in the paths 16a . . . 16n), and each sub-flow operates as a conventional Transmission Control Protocol (TCP) on the assigned bytes. However, this is extremely complicated to manage, especially in a dynamic setup (e.g. when network condition changes over time across different paths.

In order to avoid tracking the sequence number of each packet through each path, the network coding protocol as described below in conjunction with CTCP is used.

Each of the sub-flows of CTCP, whenever allowed to transmit, forms a linear combination of the packets within the file and hands this combination to the IP layer for delivery. The linear combination can be generated at random or deterministically involving all or any subset of the packets within the file. The coding strategy may affect the decoding complexity at the receiver 14. A particularly efficient coding method is to form a random linear combination of a small subset of packets, which may be chosen at random or deterministically.

It is important to ensure that CTCP's packet structure is compatible with traditional TCP or UDP's packet structure so that the nodes within the network, such as current implementation of middle boxes and Network Address Translations (NATs), can operate without modification. In one embodiment, the coefficients of the linear combination are embedded within the payload so that they can be used for decoding.

Figure 2:
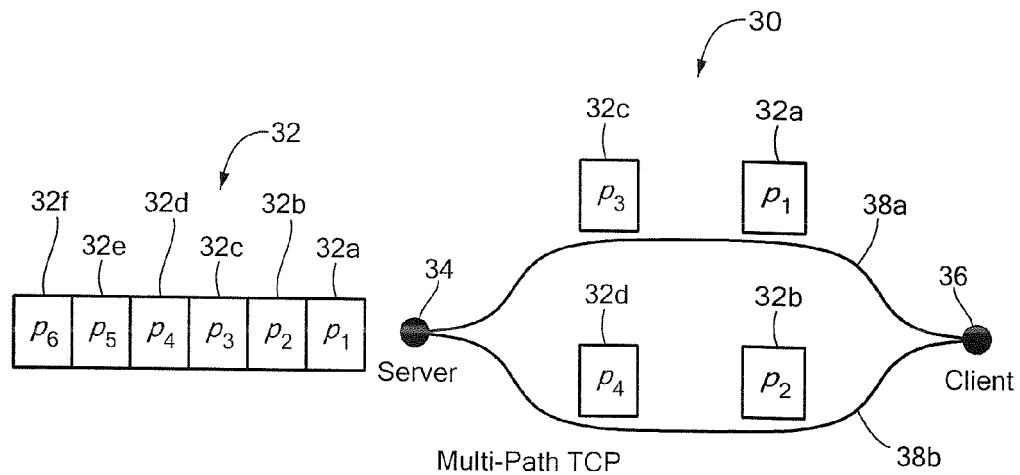
FIG. 2 is an example of CTCP sending coded packets through multiple paths.
Figure 2A:
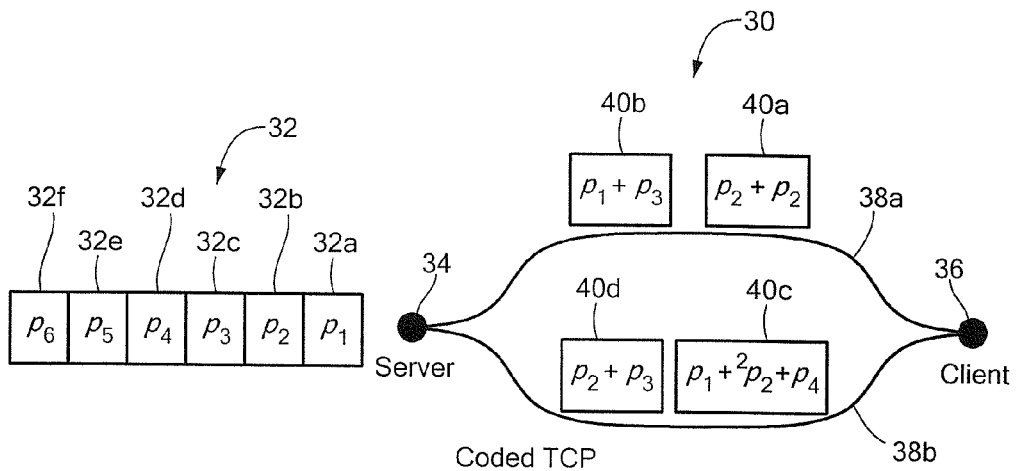

Referring now to FIGS. 2 and 2A, a comparison of multipath TCP (MPTCP) and CTCP is shown. In FIG. 2, MPTCP divides even and odd numbered packets for transmission, i.e. $P_1$ $P_3$, and $P_5$ to a first path 38a and $P_2$, $P_4$, and $P_6$ to a second different path 38b If a packet, for example packet $P_3$, is lost, then MPTCP must retransmit packet $P_3$. Therefore, MPTCP needs to decide which path over which to retransmit packet $P_3$.

In order to fully utilize the diversity of the network, server 34 may choose to transmit packet $P_3$ over both paths; however, this can lead to redundancy and waste of bandwidth. To be bandwidth efficient, MPTCP may choose to transmit packet $P_3$ only over a single path (e.g. path 38a) but this risks delaying the entire transmission because of the path 38a being the slower of the two paths 38a, 38b, i.e. the bottleneck path.

On the other hand, in FIG. 2A, CTCP forms a linear combination of the available packets 32a-32f generally denoted 32. In order to decode, the receiver needs a predetermined number of linearly independent combinations of the packets 32 (e.g. any four linearly independent combinations of the packets), defined as degrees of freedom. If one of coded packets 40a, 40b, 40c, 40d are lost, server 34 may choose multiple linearly independent combinations of the packets 32 for transmission on paths 38a, 38b. If all packets (e.g. 40a, 40b or 40c, 40d and the newly generated packet) get delivered, then both packets can be used for decoding in the future; thus, the receiver now only needs one more degree of freedom to decode.

In contrast to the novel CTCP concepts, traditional TCP flows use a sliding window mechanism for congestion management. TCP's congestion window denotes a contiguous subset of the data that can be transmitted without being acknowledged yet. As acknowledgments arrive at the sender, TCP may slide its congestion window to transmit more data. The size of the congestion window can change over time, based upon the behavior of the received acknowledgements and the round-trip time (RTT) estimate.

In order to take advantage of coding, CTCP modifies the notion of sliding/congestion window. Since coding removes the identity of a transmitted packet, in order to limit the congestion in the network, each transmitted packet should correspond to a particular token available at the sender. The total number of tokens corresponds to the size of the congestion window in the traditional TCP. CTCP uses an acknowledgement mechanism based upon the degrees of freedom received. In particular, the receiver/client 36 examines each delivered coded packet. If it is linearly independent from the past received packets, the receiver acknowledges the degree of freedom. This acknowledgement can involve a sequence number for queue management at the sender. Further, the acknowledgements can be used for congestion estimation and control. When an acknowledgement is received, a token is returned to the sender. Thus, the sender is allowed to transmit an additional coded packet.

The tokens can be generated or removed based upon a congestion control mechanism. For example, if multiple packets are lost or congestion is detected via longer RTT estimates, it may be desirable to decrease the rate of transmission by removing a few tokens. Also, it may be desirable to generate new tokens if there is enough bandwidth available for the particular sub-flow. This token-based congestion control mechanism allows each sub-flow to achieve the largest throughput despite the losses and failures without overflowing the network.

It should be noted that in a lossy environment, TCP mistakes the losses as congestion, which leads to TCP's performance degradation. A recent improvement to TCP congestion control is the so-called "fast-retransmit mechanism." Fast-retransmit involves re-transmitting a particular lost packet to continue the TCP flow, which requires in-order delivery.

With CTCP, however, a lost packet can be substituted by any other coded packet. Thus, CTCP does not need a fast-recovery mechanism. Rather, CTCP detects failures by assigning a timer (e.g. TTL) to each token. When failures are detected, CTCP may re-generate the token and retransmit a coded packet.

Figure 3:
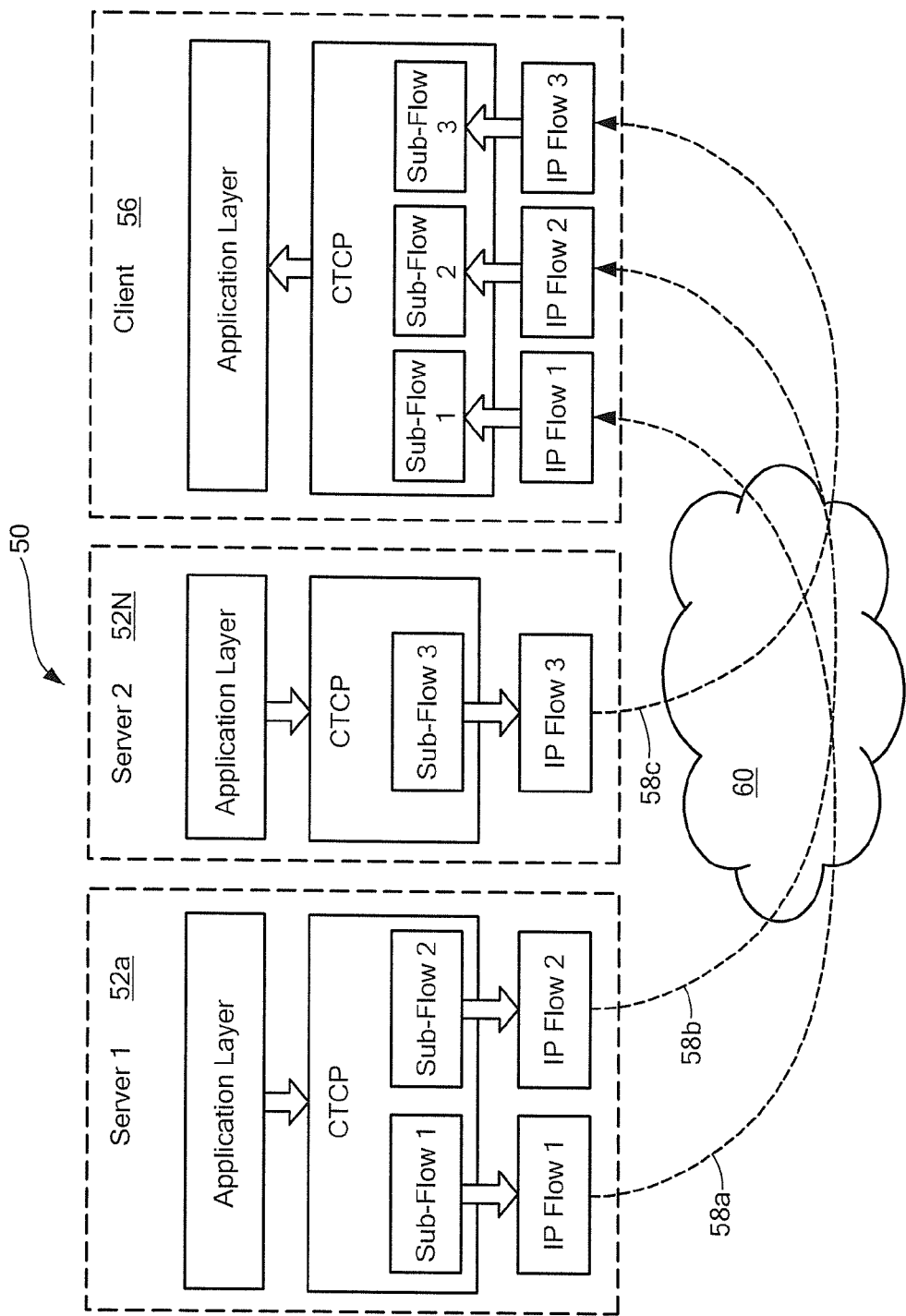
FIG. 3 is an example of CTCP with multiple servers.

Referring now to FIG. 3, a client-server system includes multiple servers 52a-52N (here only two servers being shown for clarity) (generally denoted S) and at least one client 56C. Servers S utilize one or more of multiple paths to couple to each of the one or more clients C. In the exemplary embodiment of FIG. 3, only three paths 58a-58c are shown although any number of paths may also be used. The servers S and clients C each include an application layer which operates via CTCP. One of the main advantages of CTCP is that it allows the receiver 56 to use multiple paths (e.g. paths 58a-58c) and/or multiple servers (e.g. servers 52a, 52b) simultaneously. This can be accomplished without the servers coordinating with each other.

It should be appreciated that MPTCP cannot achieve this without close coordination among the servers. Thus, MPTCP does not scale the way CTCP can.

When using CTCP, each sub-flow (which can be on different servers) forms the coded packets independently; moreover, the congestion control mechanism for each sub-flow can operate without direct rate coordination with other sub-flows. Therefore, each sub-flow can achieve the maximum throughput available without overloading the network. By properly generating the acknowledgements at the client side, the receiver can control the rate at which each sub-flow generates coded packets. For example, the receiver can prematurely acknowledge receiving some degrees of freedom over a particular sub-flow to force that sub-flow from sending more coded packets. Also, the receiver may delay sending acknowledgements or not send acknowledgements of packets that it has received. Thus, the receiver can control the amount of redundancy introduced by the sub-flows. The amount of redundancy should be sufficient to battle the losses in the network; however, small enough to avoid wasting network resources.

Another advantage of CTCP is that it can take advantage of distributed storage. Not only can CTCP use multiple servers, CTCP clients can recover the entire file or data even if the file is scattered over the network. For example, instead of storing multiple copies of a particular file, coded partial copies of the file may be formed and stored at various locations (e.g. at some edge servers or close to cellular base stations). This method of distributed storage is resilient to storage failures and requires smaller storage space.

In addition to using multiple servers and distributed storage, CTCP can establish connections through different interfaces and medium simultaneously. For example, consider a device with 3G, WiFi, and Bluetooth interfaces. Current implementations do not allow the device to use multiple interfaces at the same time. For instance, even if both 3G and WiFi are enabled on the device, the WiFi interface is the active network interface for data communication and the 3G interface acts as a backup to the WiFi connection. This restriction of the current implementations comes primarily from the fact that it is difficult to coordinate transfer of packets across multiple paths/flows/interfaces. On the other hand, CTCP alleviates the need of coordination among different paths/flows/interfaces by using coding.

One of the key benefits of CTCP is its extreme resilience to network failures. By taking advantage of multiple paths/flows/interfaces, CTCP is able to establish and maintain the connection even if part of the network fails. For example, suppose that both 3G and WiFi are active simultaneously on a device. If WiFi fails, then 3G can help maintain the connection without incurring any delay associated with initialization/handshaking, which is necessary in the current implementations. Moreover, CTCP can readily provide seamless soft horizontal and vertical hand-over across different access points, access technologies/interfaces, and networks.

In order for the receiver to decode the data, it needs to collect enough degrees of freedom. As a result, the coding operation performed by CTCP may seem that it will incur a higher delay in delivering data to the application. This may make CTCP less appealing for delay-sensitive applications, such as media streaming. However, described below is a method to both reap the benefit of coding (as mentioned above) and meet the delay constraints of the applications.

By constraining the set of packets combined together, one can control the number of successful transmissions needed to deliver a particular subset of the packets. For example, a media file can be divided into chunks, i.e. small file portions or units from an application point of view but large enough to leverage the benefits of coding. A chunk can be 2-4 seconds of a media file, which could be as large as 1 MB. Chunks are delivered sequentially to the client. The server-side CTCP forms linear combinations from the current chunk to be delivered. This limits the delay seen by the application, since the receiver does not need to decode the whole file before it can decode the chunk and submit it to the application layer.

Figure 4:
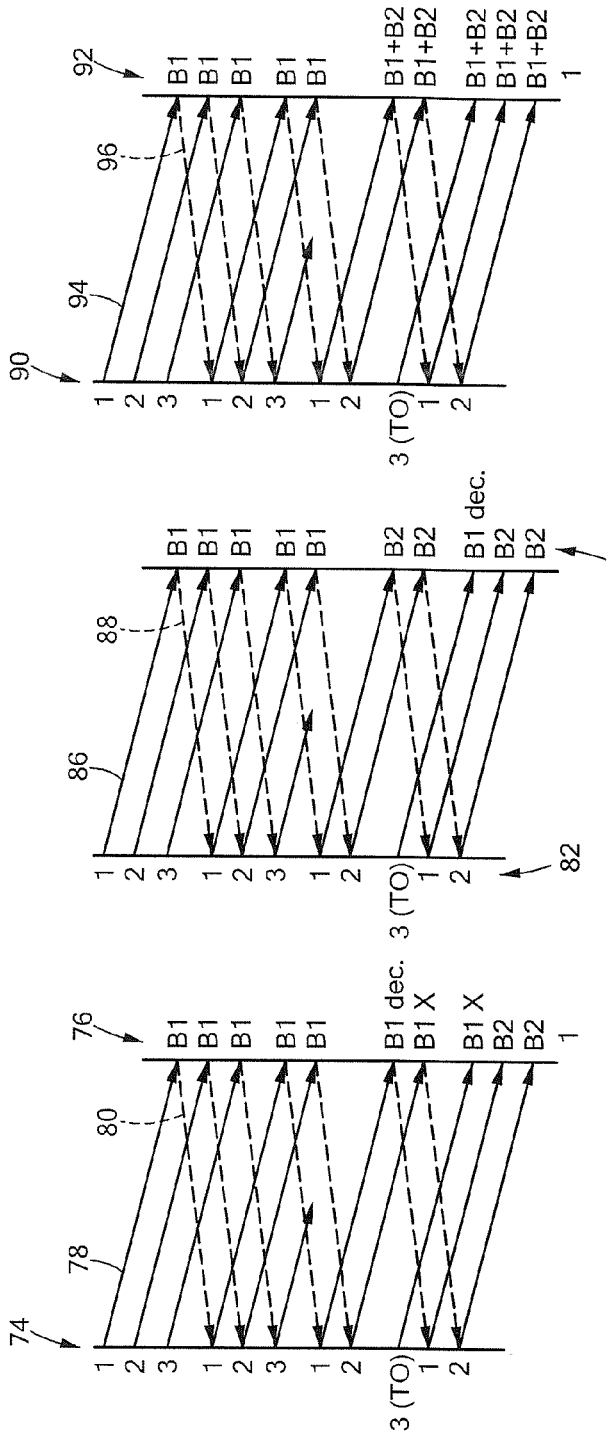
FIG. 4 is an example of a coded packet divided into two blocks (or chunks) B1, B2.
Figure 4:
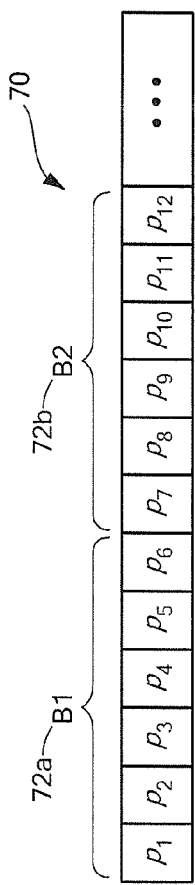

FIG. 4 illustrates a linear combination of coded packets 70 comprised of a plurality of individual coded packets, here twelve packets $p_1$-$p_{12}$ being shown. Coded packets $p_1$-$p_{12}$ are grouped into two blocks B1, B2 (also referred to as chunks 72a, 72b). FIGS. 4A-4C illustrate different transition strategies.

Referring now to FIG. 4A, an example of a transition strategy in which a source 74 begins sending (as indicated by reference numeral 78) coded packets corresponding to a first block B1 to a destination 76 is shown. The source keeps delivering (or otherwise sending or transmitting) the coded packets from the current block B1 until a desired number of degrees of freedom are acknowledged. At this point, source 74 begins sending coded packets from a second block (i.e. block B2) and similarly keeps delivering the coded packets from the second block until a desired number of degrees of freedom are acknowledged. This process is repeated until all blocks have been delivered and acknowledged.

FIG. 4B is an example of a transition strategy in which a source 82 begins sending (as indicated by reference numeral 86) coded packets from a first block (e.g. block B1) to a receiver 84. Once a desired number of transmissions have been (e.g. a number of transmissions suitable for decoding block B1 at the receiver), the source delivers a next block (e.g. block B2). If any packet loss is detected, the source retransmits a coded packet for the corresponding block.

FIG. 4C is an example of a transition strategy in which a source 90 begins sending coded packets from a first block (e.g. block B1) to a receiver 92. A transition is deferred until the end of a next block at which point the source sends coded packets from both blocks (e.g. both blocks B1+B2 as shown in FIG. 4C);

Referring now to FIGS. 4A-4C, each server-side CTCP sub-flow needs to make a decision regarding when and how it should transition from the current chunk to the next chunk.

FIGS. 4A-4C illustrate several different exemplary transitions. The particular transition strategy to use for any given application depends, at least in part, upon the urgency of the current chunk to the application. This urgency can be signaled through an application programming interface (API) from the application layer, or can be estimated using the communication history.

For instance, consider a scenario in which the sub-flow is nearing the end of a current chunk (or block). As discussed in conjunction with FIG. 4A, the server may choose to send additional degrees of freedom in order to combat losses without waiting for the feedback from the receiver or token expiration. Note that it is desirable to have an estimation of the loss rate within the network in order to avoid generating too many redundant degrees of freedom. For example, if the loss rate is 10%, then one may want to send approximately 10% more coded packets corresponding to the unacknowledged data.

On the other hand, the server may choose to transition to the next chunk thereby avoiding the need to send redundant packets while risking the completion of the current chunk. This is discussed above in conjunction with FIG. 4B.

Furthermore, as described in conjunction with FIG. 4C, the server may decide to defer the transition by sending coded packets across the current and the next chunk. By deferring the transition, one reduces or possibly even eliminates the potential inefficiencies caused by redundant packets. However, this approach also delays the delivery of the current chunk. We may defer the transition only if the current chunk is not urgently needed by the application layer. For example, if there are sufficient amount of decoded data buffered at the media player, then the current chunk delivery can be delayed without hurting the user experience.

It should be appreciated that CTCP as described herein can be implemented such that it can completely replace the Transmission Control Protocol (TCP) at the transport layer without requiring any changes in the upper and/or lower layers. The application layer may access CTCP with the same API commands as it would access a TCP socket. Moreover, the CTCP packets may be structured such that it appears as a TCP packet to the IP layer. This is particularly useful for compatibility with the current implementations of middle boxes (i.e. a device in the Internet that provides transport policy enforcement) and network address translators (NATs).

In addition, if any of the end-points are not capable of supporting CTCP, they can still establish a connection with a CTCP-enabled device as a TCP session. This, in particular, can be achieved during the handshake phase. If at least one of the endpoints does not confirm that it can support CTCP, the whole session can roll-back to a regular TCP session.

Even within a single cellular network/device, there are multiple cellular access technologies, including, but not limited to, 2G, 3G, and 4G. Currently, once a device selects one of these technologies for data transfer, there is no mechanism for this device to switch to other technologies without interrupting the data transfer sessions. This can prevent efficient data transfer, especially when moving across coverage areas utilizing different access technologies. For example, 2G is currently more widespread than 4G, but has a much lower speed. If a connection is started in an area where only 2G is available, when the device moves into an area with both 4G and 2G coverage, the speed of data transfer will not show any improvement. This is a result of the fact that the current network protocols cannot handover the connection from a 2G to a 4G without interrupting the data transfer session. Consequently, if a connection is started in an area where 4G is available, when the device moves out of 4G's coverage, the connection is immediately dropped. The data transfer session has to be re-established over the available access technology in this example 2G access technology. The systems and techniques described herein resolve the above issues by establishing simultaneous connections across the different cellular technologies.

Thus, there are scenarios in which a device may not be able to connect simultaneously to two access points (e.g. as provided by a device that allows wireless devices to connect to networks using Wi-Fi, Bluetooth or related standards sometimes through a router and can relay data between the wireless devices and devices on the networks). This could, for example, be due to hardware constraints such as the device having a single WiFi card thereby limiting the device to be associated to a single WiFi access point at any given time. Such a limitation poses a challenge to a soft-handoff between two access points.

Figure 5:
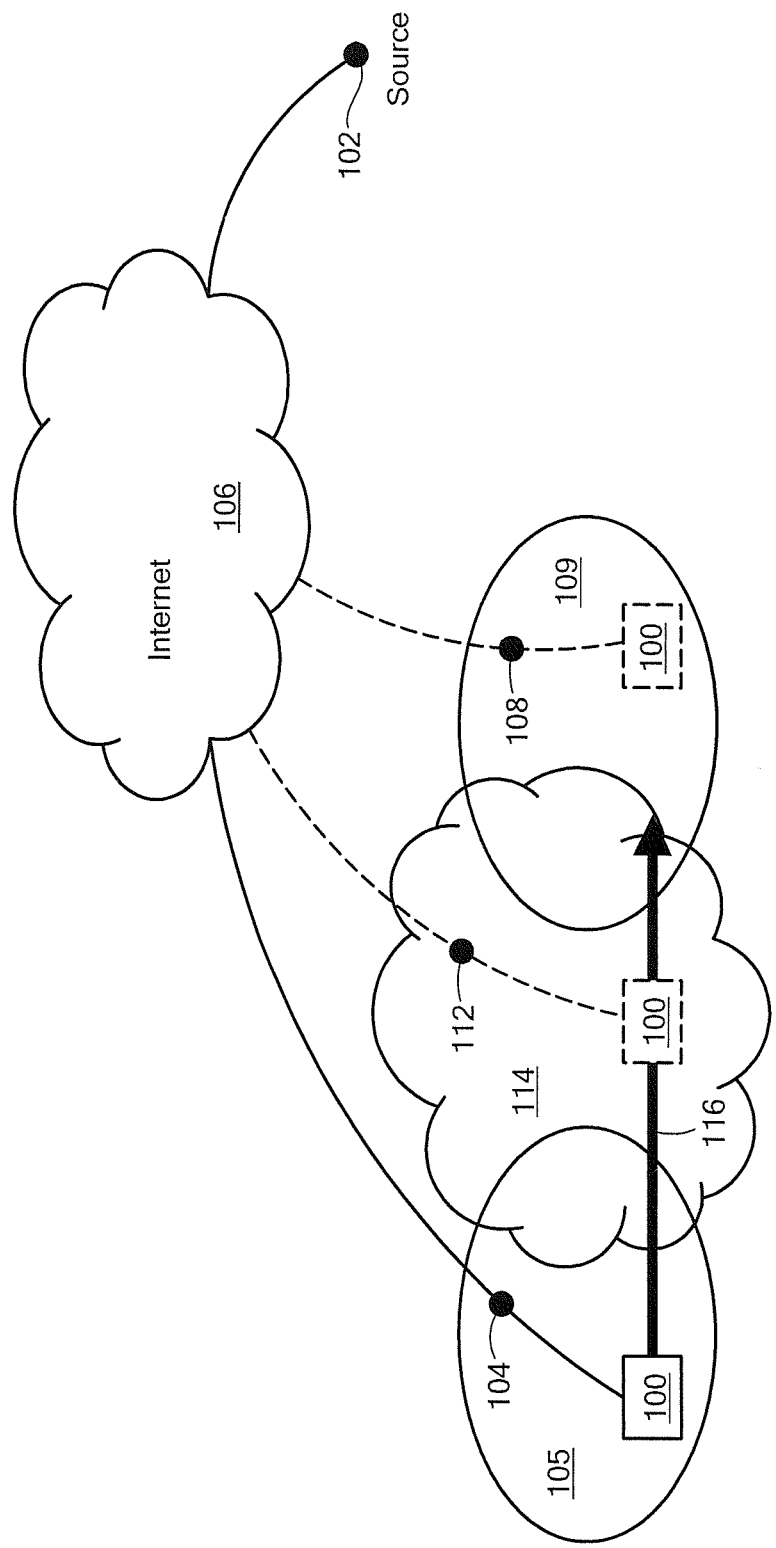
FIG. 5 is a block diagram of an exemplary system illustrating a handoff between two access points using an intermediate access point.

To address such a challenge and with reference now to FIG. 5, the coded communication protocol described herein can be used to implement a method of soft-handoff between two different available access points. In FIG. 5, it is assumed that client-device 100 communicates with a source (e.g. server) 102 through an access point 104. Access point 104 may, in turn, utilize an internet 106 to complete the path between client-device and 100 and source 102. Client-device 100 may be provided, for example, as any type of portable wireless networking device. Client-device 100 may be a hand held device, but is not limited to hand-held devices.

In the exemplary embodiment of FIG. 5 first and second access points 104, 108 are shown as is an intermediate access point 112. Access points 104, 108 provide respective coverage areas 105, 109 and intermediate access point 112 provides a coverage area 114.

In the exemplary embodiment described in conjunction with FIG. 5, access points 104, 108 are each provided as WiFi access points and intermediate access point 112 utilizes 2G, 3G or 4G access technology. It should, of course, be appreciated that in other embodiments access points 104, 108 may be provided via access technologies other than WiFi. For example access points 104, 108 may be provided via Bluetooth or other access technologies. Thus, FIG. 5 illustrates an example where the two access points 104, 108 are using first and second access technologies (here both illustrated as WiFi technologies), and intermediate access point 114 utilizes a different access technology (e.g. 2G, 3G or 4G technology).

Reference numeral 116 indicates a direction in which client-device 100 is moving. Client-device 100 is not able to simultaneously establish two WiFi connections. Thus, as client device moves along path 116 from coverage area 105 to coverage area 114, any data transfer session of client-device 100 will be uninterrupted as client-device 100 moves from the coverage area 105 provided by access point 104 to coverage area 109 provided by access point 108.

Using the concepts, systems and methods described herein, however, client-device 100 can seamlessly transfer the connection from the coverage area 105 provided by access point 104 to a coverage area 114 provided by the 3G access point 112 and then again from coverage area 114 provided by the 3G access point 112 to network coverage area 109 provided by access point 108. That is client-device 100 can seamlessly transfer the connection from WiFi 1 to 3G, then from 3G to WiFi 2. Hence, any data transfer session of client-device 100 will be uninterrupted as device 100 moves from the first WiFi network (i.e. WiFi 1) to the second WiFi network (i.e. WiFi 2). That is, client-device 100 can maintain uninterrupted service (e.g. an uninterrupted data session with server 102) as client device 100 moves from WiFi 1 to WiFi 2.

Such a seamless transfer of a data session between disparate networks can be accomplished utilizing the coding algorithms and control methods described herein. Thus, in a communication system in which a client-device cannot connect to a server simultaneously through first and second access points and wherein each of the first and second access points are using first and second access technologies, a method for transferring an ongoing data session between the first and second access points includes establishing a first connection 119 between the client-device 100 and the server 102 via the first access point 100. As the client-device 100 moves outside the coverage region 105 provided by the first access point 100, the client-device 100 establishes a second connection between the client-device 100 and server 102 via an intermediate access point 114. Intermediate access point 114 establishes a second connection between the client-device 100 and server 102 via an intermediate access point 114. Significantly, at least one of the connections between the first and the intermediate access points must be provided via a coded protocol.

Once the second connection between the client-device 100 and server 102 is established via intermediate access point 114, the first connection through the first access point is terminated.

Next, once the first connection through the first access point is terminated, client-device 100 establishes a third connection between the client-device 100 and the server 102 via the second access point 108. Significantly at least one of the connections between the intermediate and second access points is provided via a coded protocol. Once the third connection between the client-device 100 and server 102 is established via the second access point 108, the second connection through the intermediate access point is terminated.

As discussed above, the first access point, the second access point and the intermediate access point can utilizes one of a plurality of different access technologies including but not limited to 2G, 3G or 4G access technology, WiFi or Bluetooth access technologies or EDGE/GPRS, EvDo, LTE, WiMax, HSPA technologies.

As noted above, the access technology used at the first access point and the access technology used at the intermediate access point are different access technologies. As also noted above, in one embodiment, the coded protocol allows client-device 100 to transfer the connection from WiFi technology used at the first access point to one of 2G, 3G or 4G technology used at the intermediate access point and then back to WiFi technology used at the second access point.

It should be appreciated that the coding algorithms and control methods described herein above are not limited to implementation in any particular layer of the network protocol stack. For example, the disclosed method may be implemented in the physical layer, link layer, network layer, transport layer and/or application layer. Depending upon which layer in which the coded protocol is implemented, the size of the data units (packets) and the time scale of the coding operations may vary. Nevertheless, features of the method, such as soft vertical-handoff, dynamic load balancing, and ability to maintain multiple connections simultaneously across different interfaces may be maintained regardless of the layer in which the coded protocol technique described herein is implemented.

The foregoing description has been directed to specific embodiments. It will be apparent, however, that variations and modifications may be made to the described embodiments, with the attainment of some or all of their advantages. For instance, it is expressly contemplated that certain components and/or elements described herein can be implemented other than as specifically shown. For example, even though the concepts, systems and techniques described are presented as a transport protocol, after reading the disclosure provided herein, it should be understood after that the same methods may be implemented in the application layer when an unreliable transport protocol e.g. UDP, is in place.

Accordingly, it is submitted that that the concepts and techniques described herein should not be limited to the described embodiments but rather should be limited only by the spirit and scope of the appended claims.

What is claimed is:

1. In a network, a method of transmitting data from a source node to a destination node, the method comprising:
    (a) forming linear combinations of packets at the source node, wherein the linear combinations of packets represent the data to be transmitted;
    (b) delivering the linear combinations of packets formed at the source node from the source node to the destination node over multiple network paths, wherein no additional coding of the data is done between the source node and the destination node, wherein the source node includes a number of available tokens and delivering linear combinations of packets includes delivering a linear combination of packets for each token available at the source node;
    (c) providing feedback from the destination node to the source node in response to receipt of linear combinations, wherein the feedback is sent over the same network path that the corresponding linear combination was delivered over, wherein providing feedback includes returning corresponding tokens to the source node;
    (d) estimating congestion in individual network paths at the source node using feedback received from the destination node;

(e) changing transmit rates within the multiple network paths based upon estimated congestion; and (f) forming new linear combinations of packets at the source node based on returned tokens associated with the feedback and delivering the new linear combinations of packets from the source node to the destination node.

2. The method of claim 1 wherein:

providing feedback includes checking each linear combination received at the destination node to determine whether the linear combination is linearly independent from previously received linear combinations and sending an acknowledgement to the source node if the received linear combination is linearly independent from previously received linear combinations;

each of the multiple network paths has a corresponding number of tokens that is indicative of an amount of data that can be transmitted within the path without acknowledgement; and changing transmit rates within the multiple network paths includes changing a number of tokens associated with a first path.

3. The method of claim 1 further comprising repeating (c)-(e) until the original data is decoded at the destination node.

4. The method of claim 1 wherein the source is a server and the destination is a client.

5. The method of claim 1 wherein the linear combinations of packets are formed using a plurality of packets that represent a file.

6. The method of claim 1 wherein (a) and (b) are implemented in one of:
a link layer;
a transport layer; and
an application layer.

7. The method of claim 1 wherein forming linear combinations of packets comprises generating a linear combination of packets at random or deterministically.

8. The method of claim 5 wherein the linear combinations of packets each comprise all packets which make up the file.

9. The method of claim 5 wherein the linear combinations of packets each comprise a subset of the packets which make up the file.

10. The method of claim 1 wherein forming linear combinations of packets comprises forming a random linear combination of a subset of packets in the plurality of packets.

11. The method of claim 10 wherein the subset of packets is selected randomly or deterministically.

12. The method of claim 1 wherein forming linear combinations of packets includes forming a first coded packet, the first coded packet including a first linear combination of packets and coefficients used to form the first linear combination of packets.

13. The method of claim 1 wherein the one or more network paths are established through one or more network interfaces at the client.

14. The method of claim 13 wherein the one or more network interfaces at the client includes multiple network interfaces that use one of: the same access technology or different access technologies.

15. The method of claim 14 wherein the access technology corresponds to one or more of Bluetooth, WiFi, 2G, 3G and 4G technologies.

16. The method of claim 1 wherein (a) is implemented in an application layer and (b) is implemented in a link layer or a transport layer.

17. The method of claim 16 wherein (b) is implemented using tunneling through a User Datagram Protocol (UDP) connection.

18. A method for transmitting a file between one or more servers and one or more clients through one or more network paths, the method comprising:

(a) for M information packets, generating a number of linearly coded packets at a server, each linearly coded packet including a linear combination of the M information packets, wherein the M information packets represent data from the file to be transmitted to a client, wherein M is an integer greater than zero;

(b) sending linearly coded packets from the server to the client, wherein the server includes a number of available tokens and sending linearly coded packets includes sending a linearly coded packet for each token available at the server;

(c) upon reception of linearly coded packets at the client, providing feedback from the client to the server, wherein providing feedback includes returning corresponding tokens to the server;

(d) based upon returned tokens associated with the feedback from the client, forming new linear combinations of packets at the server; and (e) delivering the new combinations of packets from the server to the client.

19. The method of claim 18 further comprising repeating (c)-(e) until the original file is decoded at the client.

20. The method of claim 18 wherein sending comprises transmitting linearly coded packets having a fixed packet size.

21. The method of claim 18 wherein the server uses tokens within the feedback provided by the client to estimate network conditions in the path from the server to the client.

22. The method of claim 18, wherein:

sending linearly coded packets from the server to the client includes sending the linearly coded packets via multiple different paths;

providing feedback from the client to the server includes sending the feedback via respective paths; and delivering the new combinations of packets from the server to the client includes adjusting rates in the multiple different paths based on the feedback.

23. The method of claim 18, wherein the method includes transmitting the file from multiple servers to the client, wherein information packets stored at each different server either fully describe the file or include partial information about the file.

24. The method of claim 23, wherein information packets stored at each different server include partial information about the file and the partial information at the servers is stored in a coded fashion.

25. The method of claim 18, wherein: (a) and (d) are implemented in an application layer and (b) and (e) are implemented in a link layer or a transport layer.

26. The method of claim 25 wherein (b) and (e) are implemented using tunneling through a User Datagram Protocol (UDP) connection.

27. A method for transmitting original information between one or more sources and one or more destinations, the method comprising:

(a) for M information packets, generating $N_M$ linearly coded packets at one of the one or more sources, wherein the M information packets represent the original information to be transmitted from at least one of the one or more sources to one of the one or more destinations, wherein M is an integer greater than zero; each of the $N_M$ linearly coded packets including a linear combination of the M information packets, wherein $N_M$ is an integer number of initial linearly coded packets to be generated at the one of the one or more sources;

(b) delivering the $N_M$ linearly coded packets from the source to one of the one or more destinations, wherein the source includes a number of available tokens and delivering $N_M$ linear coded packets includes sending a linear coded packet for each token available at the server;

(c) upon reception of linear coded packets at the destination, providing feedback from the destination to the source, wherein providing feedback includes returning corresponding tokens to the source;

(d) based upon the feedback from the destination, forming a new linearly coded packet at the source, wherein forming a new linearly coded packet includes detecting a failure of delivery of a linearly coded packet associated with a first token and re-generating the first token within the source in response thereto; and (e) delivering the new linearly coded packet from the source to the destination.

28. The method of claim 27 further comprising repeating (c)-(e) until the original information is decoded at the destination.

29. The method of claim 27, wherein: (a) and (d) are implemented in an application layer and (b) and (e) are implemented in a link layer or a transport layer.

30. The method of claim 29 wherein (b) and (e) are implemented using tunneling through a User Datagram Protocol (UDP) connection.

31. A method of transmitting data from a source node to a destination node, the method comprising implementing a network coding based protocol technique in an application layer by tunneling network coded data over a User Datagram Protocol (UDP) connection such that all network coding operations and network coding control techniques are performed at the application layer on top of UDP and such that the coding operations are performed in an end-to-end manner between the source and destination node, wherein a number of linear combinations of packets delivered from the source node to the destination node is controlled by the use of tokens, wherein the source node includes a number of available tokens and a linear combination of packets is delivered from the source node to the destination node for each available token, wherein feedback is provided from the destination node to the source node in response to receipt of linear combinations, the feedback including corresponding tokens.

32. In a network utilizing a User Datagram Protocol (UDP), a method of transmitting data from a source node to a destination node, the method comprising:

(a) in an application layer, forming linear combinations of packets at the source node wherein the linear combinations of packets represent the data to be transmitted;

(b) in one of a link layer or a transport layer, delivering the same linear combinations of packets formed at the source node from the source node to the destination node over one or more network paths wherein no additional coding of the data is done between the source node and the destination node, wherein the source node includes a number of available tokens and delivering linear combinations of packets includes delivering a linear combination of packets for each token available at the source node;

(c) providing feedback from the destination node to the source node in response to receipt of linear combinations, wherein providing feedback includes checking each linear combination received at the destination node to determine whether the linear combination is linearly independent from previously received linear combinations and sending an acknowledgement to the source node if the received linear combination is linearly independent from previously received linear combinations, wherein providing feedback includes returning corresponding tokens to the source node;

(d) in the application layer, based upon the tokens within the feedback from the source node, forming new linear combinations of packets at the source node; and (e) in one of the link layer or the transport layer, delivering the new linear combinations of packets from the source node to the destination node.

33. The method of claim 32 wherein delivering the same linear combination of packets is implemented using a tunneling protocol through a UDP connection such that all coding operations and control techniques are performed at the application layer on top of UDP to provide a coding operation performed in an end-to-end manner.

34. In a network utilizing a User Datagram Protocol (UDP), a method of transmitting data from a source node to a destination node, the method comprising:

(a) forming linear combinations of packets at the source node wherein the linear combinations of packets represent the data to be transmitted;

(b) delivering the same linear combinations of packets formed at the source node from the source node to the destination node over one or more network paths wherein no additional coding of the data is done between the source node and the destination node, wherein the source node includes a number of available tokens and delivering linear combinations of packets includes delivering a linear combination of packets for each token available at the source node;

(c) providing feedback from the destination node to the source node in response to receipt of linear combinations, wherein providing feedback includes checking each linear combination received at the destination node to determine whether the linear combination is linearly independent from previously received linear combinations and sending an acknowledgement to the source node if the received linear combination is linearly independent from previously received linear combinations, wherein providing feedback includes returning corresponding tokens to the source node;

(d) based upon the tokens within the feedback from the source node, forming new linear combinations of packets at the source node; and (e) delivering the new linear combinations of packets from the source node to the destination node.

35. The method of claim 34 wherein forming linear combinations of packets at the source node comprises forming linear combinations of packets in an application layer.

36. The method of claim 34 wherein delivering the same linear combination of packets comprises delivering the same linear combination of packets in one of a link layer or a transport layer.

* * * * *

UNITED STATES PATENT AND TRADEMARK OFFICE
CERTIFICATE OF CORRECTION

PATENT NO. : 8,780,693 B2
APPLICATION NO. : 13/291310
DATED : July 15, 2014
INVENTOR(S) : Minji Kim et al.

It is certified that error appears in the above-identified patent and that said Letters Patent is hereby corrected as shown below:

In the Specification

In Column one, lines 6-9, under "Government Rights" section delete the entire paragraph and replace with --This invention was made with Government support under Contract No. W911NF-07-1-0029 awarded by the U.S. Army Research Office. The Government has certain rights in this invention.--

Signed and Sealed this
Thirtieth Day of September, 2014

Michelle K. Lee
*Deputy Director of the United States Patent and Trademark Office*